(12) United States Patent
Bell et al.

(10) Patent No.: US 7,426,532 B2
(45) Date of Patent: Sep. 16, 2008

(54) NETWORK OF DISPARATE PROCESSOR-BASED DEVICES TO EXCHANGE AND DISPLAY MEDIA FILES

(75) Inventors: Cynthia S. Bell, Chandler, AZ (US); Nathan Y. Smith, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 470 days.

(21) Appl. No.: 10/229,373

(22) Filed: Aug. 27, 2002

(65) Prior Publication Data

US 2004/0044725 A1    Mar. 4, 2004

(51) Int. Cl.
G06F 15/16   (2006.01)

(52) U.S. Cl. .................... 709/201; 709/203; 709/217

(58) Field of Classification Search ................ 709/201, 709/203, 217, 225, 231, 246
See application file for complete search history.

(56) References Cited

U.S. PATENT DOCUMENTS

| | | | |
|---|---|---|---|
| 4,821,211 A | | 4/1989 | Torres |
| 5,024,571 A | * | 6/1991 | Shahar et al. ............... 414/231 |
| 5,227,985 A | | 7/1993 | DeMenthon |
| 5,268,674 A | | 12/1993 | Howard et al. |
| 5,317,732 A | | 5/1994 | Gerlach, Jr. et al. |
| 5,408,333 A | | 4/1995 | Kojima et al. |
| 5,546,527 A | | 8/1996 | Fitzpatrick et al. |
| 5,608,860 A | | 3/1997 | Fitzpatrick et al. |
| 5,625,783 A | | 4/1997 | Ezekiel et al. |
| 5,644,736 A | | 7/1997 | Healy et al. |
| 5,729,255 A | | 3/1998 | Aoki |
| 5,801,700 A | | 9/1998 | Ferguson |
| 5,819,103 A | | 10/1998 | Endoh et al. |
| 5,838,317 A | | 11/1998 | Bolnick et al. |
| 5,848,064 A | * | 12/1998 | Cowan ........................ 370/338 |
| 5,862,325 A | | 1/1999 | Reed et al. |
| 5,886,699 A | | 3/1999 | Belfiore et al. |
| 6,023,241 A | | 2/2000 | Clapper .................. 342/357.13 |
| 6,031,830 A | * | 2/2000 | Cowan ........................ 370/338 |
| 6,044,382 A | | 3/2000 | Martino |
| 6,121,968 A | | 9/2000 | Arcuri et al. |

(Continued)

OTHER PUBLICATIONS

Polling Technology, accessed on Jun. 14, 2006, Answers.com, Online Dictionary, pp. 1-2.*

(Continued)

Primary Examiner—John Follansbee
Assistant Examiner—Saket Daftuar
(74) Attorney, Agent, or Firm—Schwegman, Lundberg & Woessner, P.A.

(57) ABSTRACT

A first type of processor-based device, such as a personal computer functioning as a host and containing digital media files, may wirelessly communicate with a second type of processor-based device or appliance, such as a digital picture frame (DPF). Upon request and/or at periodic intervals, the host may transmit menu items and/or media files to the DPF. Responsive to user choices entered at the DPF and transmitted to the host, the host may transmit further menu items and/or media files to the DPF. Methods of polling and registering one or more DPFs by a host, of retrieving media files by a host from the Internet satisfying user-specified search criteria, and of uploading media files from a DPF to a host, are also described, in addition to a network and a machine-accessible medium.

23 Claims, 18 Drawing Sheets

U.S. PATENT DOCUMENTS

| | | | |
|---|---|---|---|
| 6,144,997 A * | 11/2000 | Lamming et al. | 709/217 |
| 6,147,683 A | 11/2000 | Martinez et al. | |
| 6,226,618 B1 | 5/2001 | Downs et al. | |
| 6,300,936 B1 | 10/2001 | Braun et al. | |
| 6,308,061 B1 * | 10/2001 | Criss et al. | 455/418 |
| 6,321,231 B1 | 11/2001 | Jebens et al. | |
| 6,356,941 B1 | 3/2002 | Cohen | |
| 6,405,239 B1 | 6/2002 | Addington et al. | |
| 6,411,312 B1 | 6/2002 | Sheppard | |
| 6,453,336 B1 * | 9/2002 | Beyda et al. | 709/204 |
| 6,462,763 B1 | 10/2002 | Mostyn | |
| 6,466,238 B1 | 10/2002 | Berry et al. | |
| 6,489,950 B1 * | 12/2002 | Griffin et al. | 345/168 |
| 6,493,743 B2 | 12/2002 | Suzuki | |
| 6,539,421 B1 | 3/2003 | Appelman et al. | |
| 6,590,601 B2 * | 7/2003 | Sukeno et al. | 348/14.01 |
| 6,628,304 B2 | 9/2003 | Mitchell et al. | |
| 6,643,506 B1 * | 11/2003 | Criss et al. | 455/419 |
| 6,675,213 B1 * | 1/2004 | Schmonsees | 709/225 |
| 6,704,031 B1 | 3/2004 | Kimball et al. | |
| 6,721,578 B2 * | 4/2004 | Minear et al. | 455/566 |
| 6,735,434 B2 * | 5/2004 | Criss et al. | 455/418 |
| 6,781,606 B2 * | 8/2004 | Jouppi | 345/698 |
| 6,820,236 B1 * | 11/2004 | Bates et al. | 715/501.1 |
| 6,839,717 B1 * | 1/2005 | Motoyama et al. | 707/104.1 |
| 6,842,219 B2 * | 1/2005 | Lee | 352/244 |
| 6,850,209 B2 * | 2/2005 | Mankins et al. | 345/1.3 |
| 6,934,532 B2 | 8/2005 | Coppinger et al. | |
| 6,934,862 B2 * | 8/2005 | Sharood et al. | 713/300 |
| 6,944,700 B2 * | 9/2005 | Bateman et al. | 710/300 |
| 6,947,772 B2 * | 9/2005 | Minear et al. | 455/566 |
| 6,947,995 B2 * | 9/2005 | Chang et al. | 709/231 |
| 2001/0019359 A1 * | 9/2001 | Parulski et al. | 348/207 |
| 2001/0033324 A1 * | 10/2001 | Sukeno et al. | 348/14.01 |
| 2001/0056434 A1 | 12/2001 | Kaplan et al. | |
| 2002/0044149 A1 * | 4/2002 | McCarthy et al. | 345/581 |
| 2002/0046108 A1 * | 4/2002 | Conrad et al. | 705/14 |
| 2002/0054139 A1 | 5/2002 | Corboy et al. | |
| 2002/0062397 A1 * | 5/2002 | Chang et al. | 709/246 |
| 2002/0062398 A1 * | 5/2002 | Chang et al. | 709/246 |
| 2002/0069236 A1 | 6/2002 | Jahnke | |
| 2002/0073075 A1 * | 6/2002 | Dutta et al. | 707/3 |
| 2002/0075331 A1 * | 6/2002 | Orbanes et al. | 345/854 |
| 2002/0078101 A1 * | 6/2002 | Chang et al. | 707/523 |
| 2002/0080177 A1 * | 6/2002 | Orbanes et al. | 345/765 |
| 2002/0083121 A1 * | 6/2002 | Chang et al. | 709/201 |
| 2002/0087400 A1 * | 7/2002 | Khoo et al. | 705/14 |
| 2002/0087546 A1 * | 7/2002 | Slater et al. | 707/10 |
| 2002/0108118 A1 * | 8/2002 | Cohen et al. | 725/105 |
| 2002/0113861 A1 * | 8/2002 | Lim et al. | 348/14.02 |
| 2002/0120760 A1 | 8/2002 | Kimchi et al. | |
| 2002/0126137 A1 | 9/2002 | Kaestner, Jr. | |
| 2002/0129068 A1 * | 9/2002 | Takasu et al. | 707/530 |
| 2002/0150387 A1 * | 10/2002 | Kunii et al. | 386/83 |
| 2002/0180803 A1 | 12/2002 | Kaplan et al. | |
| 2002/0190946 A1 * | 12/2002 | Metzger | 345/156 |
| 2002/0194414 A1 * | 12/2002 | Bateman et al. | 710/303 |
| 2003/0055872 A1 * | 3/2003 | Meidan et al. | 709/203 |
| 2003/0097350 A1 * | 5/2003 | ShamRao | 707/1 |
| 2003/0191729 A1 * | 10/2003 | Siak et al. | 706/45 |
| 2003/0206194 A1 * | 11/2003 | Boyd | 345/744 |
| 2003/0212616 A1 * | 11/2003 | Castrogiovanni et al. | 705/30 |
| 2003/0220914 A1 | 11/2003 | De Angelis et al. | |
| 2003/0227478 A1 * | 12/2003 | Chatfield | 345/751 |
| 2004/0012627 A1 * | 1/2004 | Zakharia et al. | 345/744 |
| 2004/0032936 A1 * | 2/2004 | Horel et al. | 379/114.03 |
| 2004/0044723 A1 | 3/2004 | Bell | |
| 2004/0044724 A1 | 3/2004 | Bell | |
| 2004/0044785 A1 | 3/2004 | Bell | |

OTHER PUBLICATIONS

"Digi-Frame Introduces High-End Large-Format Digital Picture Frames", *Digital Frame/Press Release*, www.digi-frame.com/press6.html,(Jan. 5, 2001), 2 pgs.

"Frequently Asked Questions: Registered, Network-Connected Kodak Smart Picture Frame", www.kodak.com/cluster/global/en/service/faqs/faq1622.shtml, (Jun. 19, 2002), 19 pgs.

Gates, Bill ,et al. , "Plugged In At Home", *In: The Road Ahead*, Published in 1995 by Viking Penguin,(1995), 216-226.

Kim, James L. ,"Digi-Frame DF-560", www.techtv.com/freshgear/print/0,23102,2582371,00.html, (Nov. 28, 2001), 2 pgs.

Kim, James L. ,"Idea Grove's Ceiva Internet Picture Frame", www.techtv.com/freshgear/print/0,23102,2426604,00.html, (Feb. 11, 2000), 2 pgs.

Kim, James L. ,"Kodak StoryBox Smart Picture Frame", www.techtv.com/freshgear/print/0,23102,6740,00.html, (Aug. 22, 2000), 4 pgs.

Kim, James L. ,"Sony CyberFrame PHD-A55", www.techtv.com/freshgear/firstlook/story/0,23008,2334151,00.html,(Oct. 1, 1999), 2 pgs.

"Structured Metadata for Application Specific Viewers for Streamed Internet Video/ Audio", *IBM Technical Disclosure Bulletin*, 40(10), (Oct. 1997), 123-128.

Adler, R. M., "Emerging Standards for Component Software", *Computer*, 28(3), (Mar. 1995), 68-77.

Berry, R. E., et al., "The Evolution of the Common User Access Workplace Model", *IBM Systems Journal*, 31(3), (1992), 414-428.

Gillet, S., et al., "A Taxonomy of Internet Appliances", http://ebusiness.mit.edu, Center for e Business@MIT, (Sep. 2000), 1-28.

Kent, P., *The Complete Idiot's Guide To the Internet*, Seventh Edition, Penguin Group (USA) Inc.,(2001), 263-277.

McFedries, P. , *The Complete Idiot's Guide to Windows 95*, Second Edition, Que® Corporation,(1997), 125-129.

Ohnishi, A., et al., "Visual Software Requirement Definition Environment", *Proceeding, IEEE, Computer Software and Applications Conference*, (COMPSAC '97), (Aug. 1997), 624-629.

Rodenstein, R. , et al., "Talking in Circles: Designing A Spatially-Grounded Audioconferencing Environment", *CHI Letters*, 2(1), (Apr. 2000),81-88.

Rohrer, T., "Metaphors We Compute By: Bringing Magic Into Interface Design", http://philosophy.uoregon.edu/metaphor/gui4web.htm, (observed Nov. 21, 1995), 7 pgs.

Ullmer, B., et al., "mediaBlocks: Physical Containers, Transports, and Controls for Online Media", *Computer Graphics Proceedings (SIGGRAPH '98)*, (1998),1-8.

Greenberg, S., et al., "The notification collage: posting information to public and personal displays", *Conference on Human Factors in Computing Systems*, ISBN 1-58113-327-8,(Mar. 31-Apr. 5, 2001),514-521.

North, C., et al., "User Controlled Overviews of an Image Library: A case study of the Visible Human", *On Digital Libraries Proceedings*, ISBN 0-89791-830-4,(1996),74-82.

Woodruff, A., et al., "Using Thumbnails to Search the Web", *Conference On Human Factors in Computing Systems*, ISBN: 1-58113-327-8,(Mar. 31-Apr. 5, 2001),198-205.

Cadiz, J. J., et al., "Designing and deploying an information awareness interface.", *Proceedings of the 2002 AMC Conf. on Computer suported cooperative work.*, (2002),314-323.

Miller, M., *Sams Teach Yourself More Windows 98 in 24 Hours*, (1998).

O'Reilly, T., et al., *Windows 95 in a Nutshell: A desktop Quick Reference*, (1998).

Terry, M., et al., "Side Views: persistent, on demand previews for open-ended tasks.", *Proceeding of he 15th annual ACM symposium on User interface software and technology*, ACM Press New York, NY,USA,(2002),71-80.

"U.S. Appl. No. 10/228,822 Response filed Aug. 22, 2007 in response to Final Office Action mailed May 22, 2007", 14 pgs.

"U.S. Appl. No. 10/228,822, Final Office Action mailed Feb. 15, 2006", 10 pgs.

"U.S. Appl. No. 10/228,822, FInal Office Action mailed May 22, 2007", 14 pgs.

"U.S. Appl. No. 10/228,822, Non-Final Office Action mailed Jan. 19, 2007", 26 pgs.

"U.S. Appl. No. 10/228,822, Non-Final Office Action mailed Oct. 19, 2005", 12 pgs.

"U.S. Appl. No. 10/228,822, Non-Final Office Action mailed Jun. 2, 2006", 13 pgs.

"U.S. Appl. No. 10/228.822, Response filed Nov. 2, 2006 Non-Final Office Action mailed Jun 2, 2006", 12 pgs.

"U.S. Appl. No. 10/228,822, Response filed Dec. 19, 2005 Non-Final Office Action mailed Oct. 19, 2005", 13 pgs.

"U.S. Appl. No. 10/228,822, Response filed Mar. 19, 2007 Non-Final Office Action mailed Jan. 19, 2007", 12 pgs.

"U.S. Appl. No. 10/228,822, Response filed Apr. 17, 2006 Final Office Action mailed Feb. 15, 2006", 11 pgs.

"U.S. Appl. No. 10/228,822, Response filed Aug. 22, 2007 Final Office Action mailed May 22, 2007", 14 pgs.

"U.S. Appl. No. 10/228,827, Final Office Action mailed Oct. 11, 2006", 24 pgs.

"U.S. Appl. No. 10/228,827, Final Office Action mailed Dec. 20, 2005", 21 pgs.

"U.S. Appl. No. 10/228,827, Final Office Action mailed Jun. 14, 2005", 26 pgs.

"U.S. Appl. No. 10/228,827, Final Office Action mailed Jan. 27, 2005", 20 pgs.

"U.S. Appl. No. 10/228,827, Non-Final Office Action mailed Mar. 23, 2006", 22 pgs.

"U.S. Appl. No. 10/228,827, Response filed Jan. 11, 2007 Final Office Action mailed Oct. 11, 2006", 7 pgs.

"U.S. Appl. No. 10/228,827, Response files Jan. 31, 2006 Final Office Action mailed Dec. 20, 2005",19 pgs.

"U.S. Appl. No. 10/228,827, Response filed Mar. 28, 2005 Non-Final Office Action mailed Jan. 27, 2995", 20 pgs.

"U.S. Appl. No. 10/228,827, Response filed Jul. 24, 2006 Non-Final Office Action mailed Mar. 23, 2006" 18 pgs.

"U.S. Appl. No. 10/228,827, Response filed Sep. 14, 2005 Final Office Action mailed Jun. 14, 2005", 17 pgs.

"U.S. Appl. No. 10/228,829, Response filed Aug. 24, 2007 in response to FInal Office Action mailed Apr. 24, 2007", 10 pgs.

"U.S. Appl. No. 10/228,829, Final Office Action mailed Apr. 24, 2007", 12 pgs.

"U.S. Appl. No. 10/228,829, Non-Final Office Action mailed Nov. 4, 2005", 16 pgs.

"U.S. Appl. No. 10/228,829, Non-Final Office Action mailed Jun. 18, 2006", 25 pgs.

"U.S. Appl. No. 10/228,829, Non-Final Office Action mailed Aug. 3, 2006", 25 pgs.

"U.S. Appl. No. 10/228,829, Response filed Nov. 6, 2006 Non-FInal Office Action mailed Aug. 3, 2006", 14 pgs.

"U.S. Appl. No. 10/228,829, Response filed Apr. 4, 2006 Non-Final Office Action mailed Nov. 4, 2005", 22 pgs.

"U.S. Appl. No. 10/228,829, Response filed Aug. 24, 2007 Final Office Action mailed Apr. 24, 2007", 10 pgs.

"U.S. Appl. No. 10/228,822 Response filed Oct. 30, 2007 in response to Final Office Action mailed May 22, 2007", 17 pgs.

"U.S. Appl. No. 10/228,822, Notice of Allowance mailed Jan. 14, 2008", 8 pgs.

* cited by examiner

NETWORK OF DISPARATE PROCESSOR-BASED DEVICES TO EXCHANGE AND DISPLAY MEDIA FILES

RELATED APPLICATIONS

The present application is related to the following applications, which were assigned to the same assignee as the present application and filed on even date herewith:

(1) Ser. No. 10/228,822, entitled "User Interface to Facilitate Media File Exchange Among Processor-Based Devices";

(2) Ser. No. 10/228,829, entitled "Apparatus and Methods to Exchange Menu Information Among Processor-Based Devices"; and (3) Ser. No. 10/228,827, entitled "Apparatus and Methods to Select and Access Displayed Objects".

TECHNICAL FIELD

Embodiments of the present invention relate generally to the storage and display of digital media and, more particularly, to a network of disparate processor-based devices to exchange and display digital media files, and to methods related thereto.

BACKGROUND INFORMATION

Computing devices, such as personal computers (PCs), are widespread within the fabric of current communications networks at every level, from in-home networks to global networks like the Internet and the World-Wide Web ("WWW"). Digital media files of many types, including pictures, video, audio, greeting cards, animations, games, artwork, music compositions, x-rays, scanned documents, software programs, and the like are frequently transmitted between computing devices.

In a variety of known examples, one processor-based device functioning as a host may communicate wirelessly or via a cable with a less fully featured processor-based device that may be referred to herein as a "processor-based appliance", a "digital appliance", an "electronic appliance", or simply an "appliance". An example is a chat pad wirelessly communicating with a PC. Another example is a processor-based telephone communicating telephone call information with a processor-based device that acts as a host. Other examples include a PDA or a digital music player that may wirelessly communicate with a PC.

A digital picture frame (hereinafter "DPF") is a processor-based appliance that enables a display for displaying digital pictures. In some embodiments, it also includes a display component. In other embodiments, the DPF connects with an external display, such as a TV. A DPF with an integral display may be used like a conventional picture frame to display pictures, such as pictures of family, friends, pets, and the like. However, with a DPF, the pictures may be changed and displayed digitally.

A number of DPFs are known in the art, including DPFs that are commercially available from Sony Corporation of America, New York City, N.Y.; Digi-Frame Inc., Port Chester, N.Y.; Ceiva Logic, Inc., Burbank, Calif.; and Eastman Kodak Company, Rochester, N.Y. DPFs may also be referred to in the art as electronic picture frames, Internet frames, or smart frames.

In the known DPFs, two basic types of picture storage are used. In one type, pictures can be obtained from a digital camera or personal computer, and the pictures are conveyed into the DPF on a removable memory element or device, such as a memory card, a MemoryStick™ device, a SmartMedia™ device, or the like.

In the second type, the DPF can periodically download pictures from the Internet into a local memory for display. In addition, some DPFs are also capable of uploading pictures via the Internet to a dedicated server.

In the field of DPFs, there is significant competitive pressure among manufacturers to increase the performance of their equipment. As market forces drive DPF manufacturers to produce DPFs with increased performance, DPF architectures and feature sets accordingly need to support the increased performance expectations.

Thus, there is a need for better ways to transfer media information between processor-based devices including, but not limited to, a host and an appliance such as a DPF.

DETAILED DESCRIPTION OF EMBODIMENTS OF THE INVENTION

In the following detailed description of embodiments of the invention, reference is made to the accompanying drawings that form a part hereof, and in which is shown by way of illustration, but not of limitation, specific embodiments of the invention. These embodiments are described in sufficient detail to enable those skilled in the art to understand and implement them, and it is to be understood that other embodiments may be utilized and that mechanical, structural, logical, electrical, and procedural changes may be made without departing from the spirit and scope of the present disclosure. The following detailed description is, therefore, not to be taken in a limiting sense, and the scope of embodiments of the present invention is defined only by the appended claims.

Figure 1:
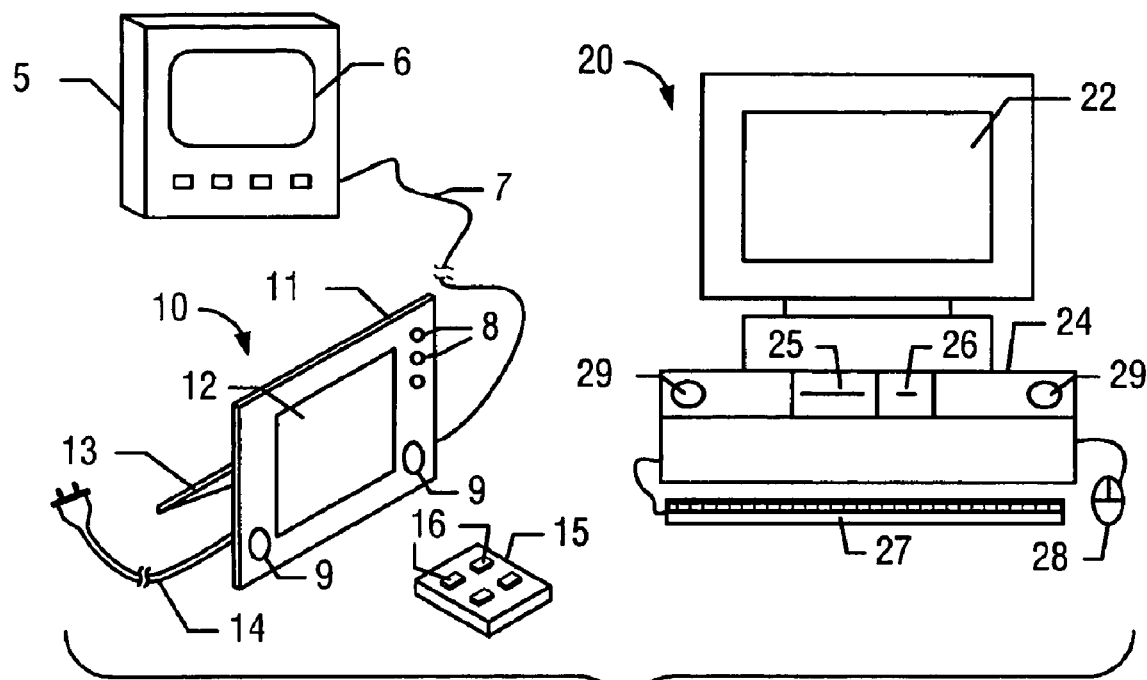
FIG. 1 is a perspective view of equipment, including a processor-based device, such as a digital picture frame, and a host computer, to implement one or more embodiments of the present invention.

FIG. 1 is a perspective view of equipment, including a processor-based device such as a digital picture frame 10, and a host computer 20, to implement one or more embodiments of the present invention. Processor-based appliance 10 and host computer 20 and are both examples of processor-based devices.

The computing equipment shown in FIG. 1 is merely one example in which embodiments of the present invention can be used. In one example, a digital media file can be routed from a host computer 20 to a DPF 10 or other processor-based device. Elsewhere in the "Detailed Description of Embodiments of the Invention" is described how a digital media file may be routed from a host computer to another host computer.

Host computer (also referred to herein simply as "host") 20 may be or include a personal computer 24. Host 20 may include a screen or display 22 in accordance with one embodiment. Host 20 may include one or more removable media slots, such as floppy disk slot 25 and memory card slot 26. Host 20 may also include a keyboard 27, a pointing device such as mouse 28, and/or any other element that permits an appliance user to input information into and receive information from host 20. Host 20 may include one or more loudspeakers 29.

Processor-based appliance 10 comprises a housing 11 and an optional screen or display 12. Display 12 displays any type of visually perceivable images, including text, graphics, and still or moving pictures. Processor-based appliance 10, in one embodiment, can optionally be coupled via a wire or cable 7 to an auxiliary display 5 having a screen or display 6, and having other user interface elements, such as controls, loudspeakers, and so forth. Auxiliary display 5 could be a television, computer monitor, or any other equipment that is suitable to render visual and/or audio media. In one embodiment, auxiliary display 5 is used with a low-cost processor-based appliance 10 that has no display 12. In another embodiment, auxiliary display 5 can provide features not provided on the processor-based appliance 10. For example, auxiliary display 5 can be a large-screen TV or high-definition TV.

Processor-based appliance 10 comprises suitable human interface elements with which an appliance user can input information into processor-based appliance 10 and receive information from processor-based appliance 10.

"Suitable", as used herein, means having characteristics that are sufficient to produce the desired result(s). Suitability for the intended purpose can be determined by one of ordinary skill in the art using only routine experimentation.

Thus, processor-based appliance 10 can comprise one or more controls 8. Alternatively, on-screen touch-sensitive buttons (not shown) could be used. In one embodiment, appliance 10 is controlled by a wireless remote control 15 having one or more control buttons 16. Appliance 10 can include one or more loudspeakers 9.

Processor-based appliance 10, in one embodiment, is optionally supported in an upright configuration by a stand 13. Processor-based appliance 10 may be coupled to a suitable wall power outlet by a power cord 14; alternatively, processor-based appliance 10 could be operated using battery-supplied power.

Processor-based appliance 10, in the embodiment shown in FIG. 1, communicates wirelessly and bi-directionally with host 20; however, in other embodiments, processor-based appliance 10 could be coupled via wire or cable to host 20.

In one embodiment, host 20 communicates with processor-based appliance 10 using radio frequency signals, for example, in accordance with the Bluetooth specification (Specification of the Bluetooth System, Version 1.1, Feb. 22, 2001), the 802.11 specification (IEEE Standard 802.11 available from the Institute of Electrical and Electronics Engineers, New York, N.Y.), a Wireless Fidelity ("Wi-Fi") protocol, or the like. Similarly, the remote control 15 may use any available wireless protocol to communicate with processor-based appliance 10. The communication may be made via a suitable infrared protocol. Typically, processor-based appliance 10 communicates with host 20 via a high bandwidth communications link, whereas processor-based appliance 10 communicates with remote control 15 using a low bandwidth link.

By using wireless communications between host 20 and processor-based appliance 10, a user of processor-based appliance 10 can conveniently roam within a reasonable distance of host 20, e.g. within the user's home.

In one embodiment, host 20 and processor-based appliance 10 are each assigned a unique 48-bit identifier (ID) to uniquely identify them. Host 20 and processor-based appliance 10 can communicate with each other by transmitting packets, using a suitable protocol. Alternatively, they could communicate in any other suitable manner.

Other types of computing devices could be substituted for host 20. Such devices may take the form of a laptop or handheld computer, for example. The substantive difference between host 20 and processor-based appliance 10 is primarily one of relative computational resources, as will be explained in greater detail regarding FIG. 17 below. In general, host 20 tends to have greater memory and/or processing resources than processor-based appliance 10.

Other types of processor-based devices or appliances 10 could be substituted for the DPF illustrated in FIG. 1. Without limitation, such alternative processor-based appliances 10 could include any device that can play back visual and/or audio information. For example, such a device may take the form of an Internet appliance, a hand-held computer, a laptop computer, a wireless communications device (e.g., cellular phone, 2-way pager, etc.), a personal entertainment device (e.g. a radio), audio-visual equipment, a personal digital assistant, an electronic book, and the like.

In accordance with one embodiment of the present invention, the host 20 may store a large number of digital pictures. These pictures may be transmitted under certain conditions to the processor-based appliance 10 for display on the display 12. In some embodiments, the display 12 displays, for variable periods of time, various pictures creating a digital slideshow on the DPF. In some cases, the pictures that are displayed on the display 12 are automatically varied with time of day and day of year or other change criteria. Thus, the picture display 12 of the processor-based appliance 10 may be periodically varied and updated to display a variety of images.

In accordance with one embodiment of the present invention, a gallery of digital pictures is provided at periodic intervals to the processor-based appliance 10. In one embodiment, a predetermined number (e.g., 40) of digital pictures may be provided each day over a wireless link to the processor-based appliance 10. The processor-based appliance 10 may then store those pictures in its memory (e.g. memory 31, FIG. 2) and may make those pictures available for display on the display 12, or the processor-based appliance 10 may automatically successively display those pictures in a slide show. In the next periodic interval, the pictures that are stored on the processor-based appliance memory may be overwritten or, if the memory capacity is sufficient, new pictures may be stored in addition to the previous interval's pictures.

However, rather than store the entire library of available pictures on the processor-based appliance 10, it may be advantageous in some embodiments to maintain the bulk of the available picture gallery on the host 20. This enables the processor-based appliance 10 to carry less storage capacity, decreasing costs in some embodiments. In addition, the need to wirelessly communicate a large amount of data between the host 20 and the processor-based appliance 10 may be reduced.

Figure 2:
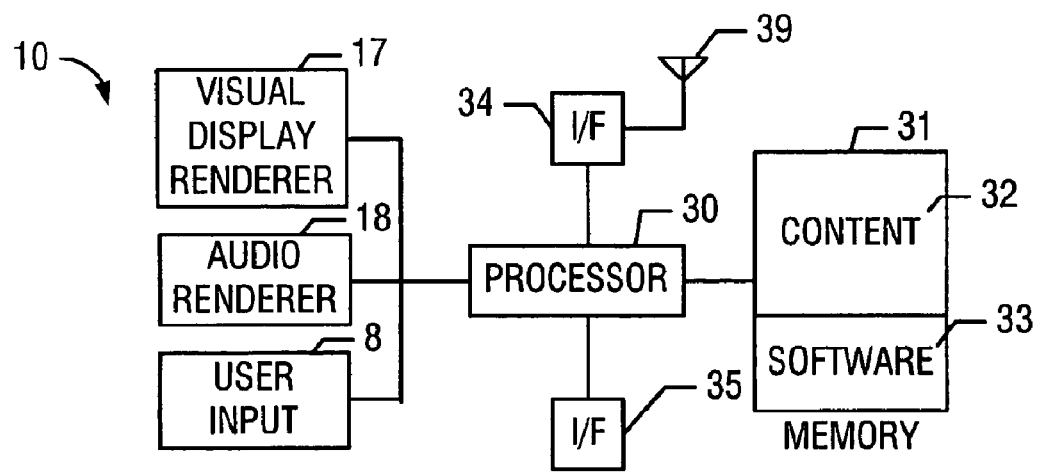
FIG. 2 is a block diagram of a processor-based appliance in accordance with an embodiment of the present invention.

FIG. 2 is a block diagram of a processor-based appliance 10 in accordance with an embodiment of the present invention. The block diagram of FIG. 2 represents just one exemplary embodiment of a processor-based appliance 10. In this example, processor-based appliance 10 comprises a DPF. Processor-based appliance 10 comprises a suitable processor 30.

As used herein, "processor" means any type of computational circuit such as, but not limited to, a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), or any other type of processor or processing circuit. The term also includes embedded controllers, such as Generic or Programmable Logic Devices or Arrays, Application Specific Integrated Circuits, single-chip computers, and the like.

A visual display renderer 17, which can include all suitable circuitry for converting digital information into human-perceivable visual form, is coupled to processor 30. An optional sound reproduction element or audio renderer 18, which can include all suitable circuitry for converting digital information into human-perceivable audio form, is also coupled to processor 30. A suitable user input element 8, such as one or more control knobs, on-screen touch-sensitive buttons, or the like is also coupled to processor 30.

A first interface (I/F) 34, having an antenna 39, is coupled to processor 30. I/F 34 is used to interface processor-based appliance 10 wirelessly with a suitable wireless interface (not shown) of host 20.

A second interface (I/F) 35 is coupled to processor 30. I/F 35 is used to interface processor-based appliance 10 wirelessly to remote control 15 (refer to FIG. 1 or 3).

Still referring to FIG. 2, a memory 31 is coupled to processor 30. Memory 31 can be any suitable memory device(s) like read only memory (ROM); random access memory (RAM); hard drive; removable media drive for handling compact disks (CDs), digital video disks (DVDs), diskettes, magnetic tape cartridges, memory cards, MemoryStick™ devices, SmartMedia™ devices, and other types of data storage; or the like.

Memory 31 can comprise digital content 32 and software 33. Content 32 can include images (both still and moving), text, audio, and any other types of digital content.

Software 33 can include one or more suitable software programs. For example, software 33 can include suitable operating system (O/S) software, one or more software applications, and any other types of software as required to perform the operational requirements of processor-based appliance 10.

Figure 3:
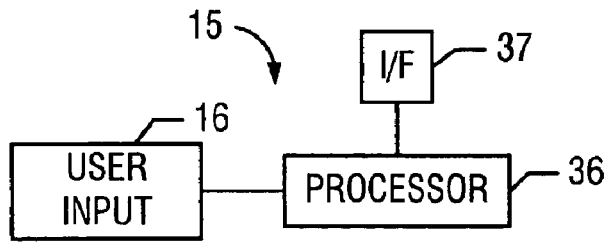
FIG. 3 is a block diagram of a wireless remote control element shown in FIG. 1, in accordance with an embodiment of the present invention.

FIG. 3 is a block diagram of a wireless remote control 15 shown in FIG. 1, in accordance with an embodiment of the present invention. The remote control 15 may comprise a processor 36 to control its operation.

Remote control 15 further comprises an interface (I/F) 37 that is coupled to processor 36. I/F 37 communicates with I/F 35 of processor-based appliance 10 (refer to FIG. 2).

Still referring to FIG. 3, remote control 15 further comprises a suitable user input 16, e.g. in the form of one or more control buttons (refer to FIG. 1).

Figure 4:
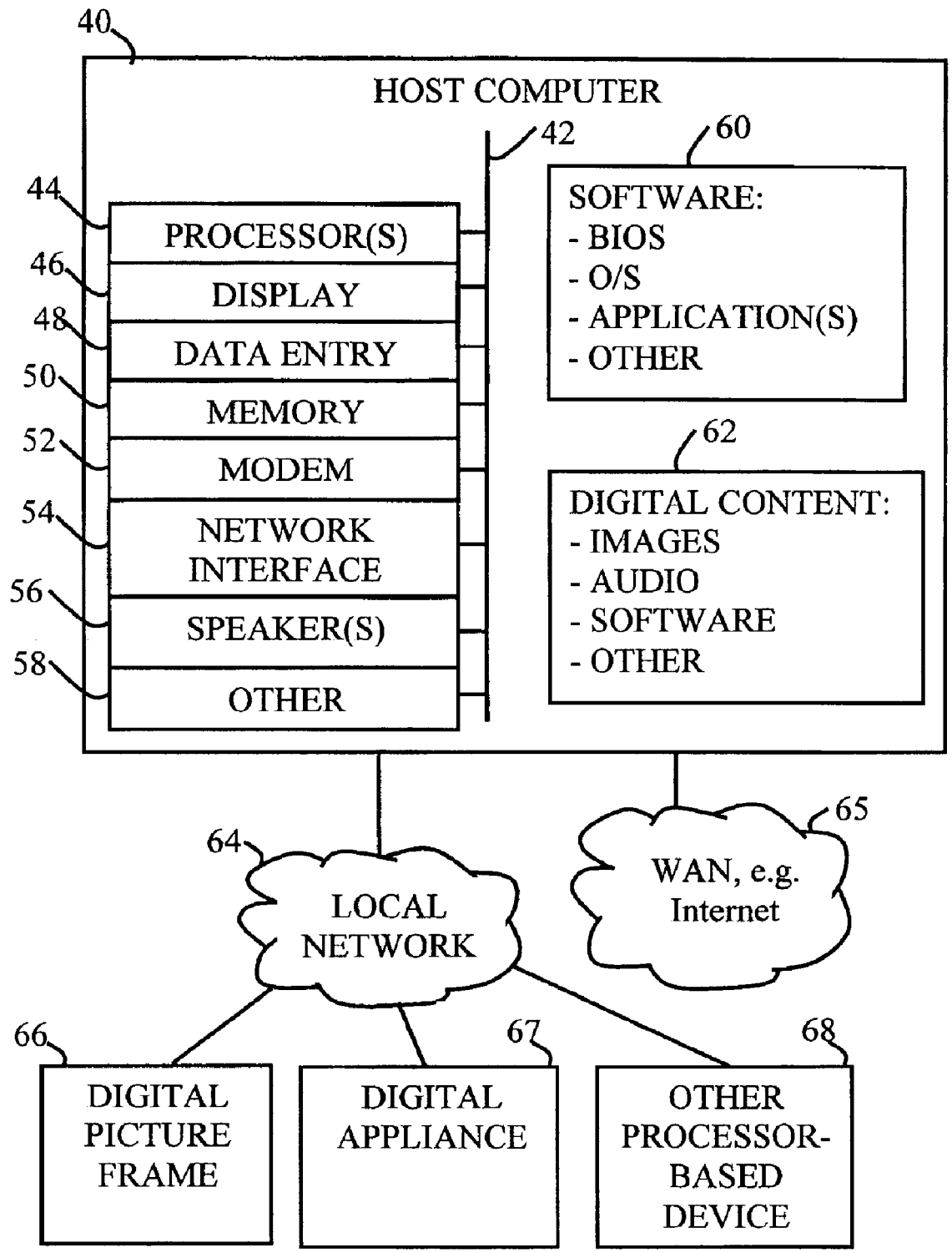
FIG. 4 is a block diagram of a host computer that is coupled to a local network and/or a wide-area network, and that implements one or more embodiments of the present invention.

FIG. 4 is a block diagram of a host computer 40 that is coupled to a local network 64 and/or a wide-area network 65, and that implements one or more embodiments of the present invention. Host 40 can be similar to or identical to host 20 illustrated in FIG. 1.

FIG. 4 and the following discussion provide a brief, general description of a suitable computing environment in which certain embodiments of the present invention may be implemented.

Thus, an exemplary host 40 comprises a computing device, a computing machine, a data processing system, or the like. Host 40 is merely one example of a computing system with which embodiments of the present invention can be used.

Host 40 comprises a system bus 42 to couple the various components of the system. System bus 42 provides communications links among the various components of host 40 and can be implemented as a single bus, as a combination of busses, or in any other suitable manner.

Coupled to bus 42 are typically one or more processors 44, a screen or display 46, and one or more data entry elements 48 such as a keyboard, mouse, trackball, joy stick, touch-sensitive screen, or the like.

Also coupled to bus 42 is a memory 50, which can include any suitable memory device(s) like read only memory (ROM); random access memory (RAM); hard drive; removable media drive for handling compact disks (CDs), digital video disks (DVDs), diskettes, magnetic tape cartridges, memory cards, MemoryStick™ devices, SmartMedia™ devices, and other types of data storage; or the like.

Additional elements may also be coupled to bus 42 such as a modem 52, a network interface unit 54, one or more loudspeakers 56, and other suitable devices 58.

Host 40 can also include a plurality of types of software programs. For example, host 40 can comprise software 60 that includes a basic input/output system (BIOS), operating system (O/S) software, one or more software applications, and any other types of software as required to perform the operational requirements of host 40.

Host 40 can also include a plurality of types of digital content 62. For example, host 40 can comprise digital content 62 that includes images (both still and moving), text, audio, computer software, and any other types of digital content.

Host 40 can operate in a networked environment using physical and/or logical connections to local network 64 and/or wide area network (WAN) 65. The connections to these networks can be wired and/or wireless.

Local network 64 can comprise any number or type of computing devices, such as a DPF 66, digital appliance 67, or any other processor-based device 68 such as those mentioned elsewhere herein.

WAN 65 can be any type of network that is greater in scope than local network 64. In one embodiment, WAN 65 comprises a global communications network, such as the Internet. In another embodiment, WAN 65 could comprise an intranet.

Embodiments of the invention may be implemented in conjunction with program modules, including functions, procedures, data structures, application programs, etc. for performing tasks, or defining abstract data types or low-level hardware contexts. Program modules may be stored in memory 50 and associated storage media, e.g., hard drives, floppy disks, optical storage, magnetic cassettes, tapes, flash memory cards, MemoryStick™ devices, SmartMedia™ devices, digital video disks, chemical storage, and/or biological storage. Program modules may be delivered over transmission environments, including networks 64 and 65, in the form of packets, serial data, parallel data, propagated signals, or any other suitable form. Program modules may be used in a compressed or encrypted format, and they may be used in a distributed environment and stored in local and/or remote memory, for access by single and multi-processor machines, or any other type of host 40.

Figure 5:
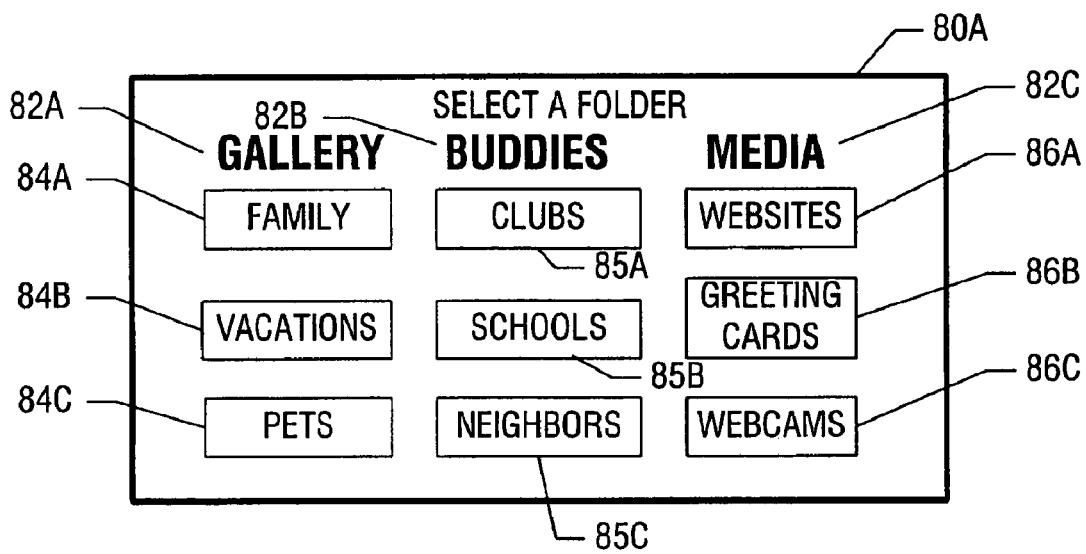
FIG. 5 illustrates a depiction of a menu of a graphical user interface (GUI) displayed on a display of a processor-based appliance, in accordance with an embodiment of the present invention.

FIG. 5 illustrates a depiction of a menu 80A of a graphical user interface (GUI) displayed on a display of a processor-based appliance, in accordance with an embodiment of the present invention.

In accordance with one embodiment of the present invention, host 20 (FIG. 1) may serve as a convenient repository to store a large number of digital pictures or other digital media files. These digital media files may be transmitted or otherwise sent to the processor-based appliance 10 for display on the display 12 and/or auxiliary display 5 and/or for output from loudspeakers 9. In some embodiments, the display 12 and/or auxiliary display 5 displays, for variable periods of time, various pictures. In some cases, the pictures that are displayed on the displays 5 and/or 12 are automatically varied. Thus, the picture display 12 of the processor-based appliance 10 and/or auxiliary display 5 may be periodically varied and updated to display a variety of images.

In accordance with one embodiment of the present invention, a collection or "gallery" of digital pictures is provided at periodic intervals to the processor-based appliance 10. The gallery can be stored on the host 20. In one embodiment, a predetermined number (e.g., 40) of digital pictures may be provided over a wireless link to the processor-based appliance 10. The processor-based appliance 10 may then store those pictures in its memory 31 (FIG. 2) and may automatically display those pictures sequentially at full screen resolution on the display 12 (FIG. 1). The processor-based appliance 10 may automatically successively or randomly display those pictures in a slide show. In the next periodic interval, the pictures that are stored in the memory 31 may be overwritten or, if the memory 31 (FIG. 2) capacity is sufficient, they may be stored in addition to the previous interval's pictures.

Rather than store the entire library of available pictures on the processor-based appliance 10 (FIG. 1), it may be advantageous in some embodiments to maintain the bulk of the available picture gallery on the host 20. This enables the processor-based appliance 10 to carry less storage capacity, decreasing costs in some embodiments. In addition, the need to wirelessly communicate a large amount of data between the host 20 and the processor-based appliance 10 may be distributed over time and as a background task while the system user enjoys the rendered data.

Thus, in accordance with one embodiment of the present invention, the available digital media content on the host 20 may have been grouped by the system user into a hierarchical structure. The levels of hierarchy may be titled. Thus, each level of a plurality of hierarchical levels may have an appropriate name or identifier. It is common for consumers to organize their personal media content collections when stored on a computing system. For example, personal digital images may be grouped by chronological or activity titles, while personal music collections may be grouped by musical genre or by artist.

Thus, the available digital media content is frequently organized in a multilevel file structure or hierarchy. The particular labels or names given to various levels in the file structure or menu structure have been chosen by the system user and have meaning to them.

In an exemplary embodiment, in order to simplify the management, including storage and retrieval, of digital media files for the appliance user, the menu hierarchy of the appliance 10 (FIG. 1), such as a DPF, can be substantially identical to that of host 20. In one embodiment, the file structure of an appliance is a subset of the file structure of a host, and the hierarchy of this subset is substantially identical to a portion of the file structure hierarchy of the host.

Thus, the particular way an appliance user likes to arrange his or her digital files on host 20 can be mirrored on the appliance user's appliance 10, simplifying file management and increasing the utility and user-friendliness of the appliance 10. Because the number of levels in a hierarchy will vary from consumer to consumer, the infrastructure devised for the appliance is adaptive. The names given to the hierarchy levels on the host are presented in menus that follow the hierarchical order on the host.

"Menu", as used herein, means a choice presented visually, audibly, and/or tactilely to an appliance user. The term "display", as used herein, means rendering in any one or more human-perceivable forms. A menu can comprise one or more menu items, either at the same hierarchical level, or at different hierarchical levels. For example, a menu could comprise two menu items or choices. If desired, each menu item could comprise one or more sub-menu items. Each sub-menu item could comprise sub-sub-menu items, and so forth, in as wide and/or as deep a hierarchy as desired.

"Sub-menu", as used herein, means a choice of selection lower than a menu item in a menu hierarchy. The particular name (e.g. "category", "folder", "menu item", "sub-menu item", "terminal item", etc.) that is given to an item at any level of a menu hierarchy is very flexible and is not limited to the examples given herein.

In the embodiment shown in FIG. 5, a three-level hierarchy is depicted. Menu selections at the highest level of the hierarchy may be called "categories". In the example shown in FIG. 5, the category level comprises "Gallery" 82A, "Buddies" 82B, and "Media" 82C.

The category of Gallery 82A depicts three menu items called "folders", in the form of "Family" 84A, "Vacations" 84B, and "Pets" 84C. In one embodiment, Gallery 82A comprises pictorial items that are stored on host 20 (FIG. 1).

Still referring to FIG. 5, the category of Buddies 82B also depicts three menu items, namely "Clubs" 85A, "Schools" 85B, and "Neighbors" 85C. In one embodiment, the "Buddy" category 82B can list groups of people to whom the appliance user may send digital images electronically. The list of potential addressees (called "Buddies" in this example) may be broken into a hierarchy that includes sublevels. At the lowest level, buddies comprise Internet account addresses for the named individuals. This digital address book may contain account addresses for instant messaging, e-mail and other Internet account types to facilitate sharing from the appliance.

The category of Media 82C depicts three menu items, namely "Websites" 86A, "Greeting Cards" 86B, and "Webcams" 86A. The category of Media 82C may include digital media sources outside the processor-based appliance 10 and host 20 (FIG. 1) from which digital media (in one embodiment) may be obtained. Each of the Media 82C items may be associated with a particular media type, so that when the particular entries 86A-86C are selected by the appliance user, the host 20 (FIG. 1) is caused to list available content from the respective digital media sources.

As an example, if the user has a DVD jukebox on his or her host system, the movie titles would appear in the menu list. In some cases, digital media items may be associated with a particular Web site. For example, one media type may be a video clip, and one sub-menu item may be a current news Web site. When this menu item is selected, the host can access an associated Web site to retrieve the current video clip and then relay it to the appliance for viewing.

Still referring to FIG. 5, regarding the categories 81A-82C, each time one level is selected, the next lower sublevel listings may be displayed. As an example, an appliance user may select a folder from the menu of folders 84A-84C listed under the category "Gallery" 82A. In doing so, one or more sub-menu items within such folder will be visually and/or audibly presented to the user, as will now be explained with reference to FIG. 6.

Figure 6:
FIG. 6 illustrates a depiction of sub-menus within the "Pets" folder of the menu illustrated in FIG. 5.

FIG. 6 illustrates a depiction 80B of sub-menus within the "Pets" folder 84C of menu 80A illustrated in FIG. 5.

The contents of the "Pets" folder 84C are displayed to the appliance user. This includes a heading "Fido" 91A and another heading "Garfield" 91B.

Under "Fido" 91A is displayed a portion of the collection 93A of photo thumbnail images of the family dog. A "thumbnail image" is a miniature version of an image that can be used for quick browsing through a plurality of images.

Under "Garfield" 91B is displayed a portion of the collection 93B of photo thumbnail images of the family cat. The user may choose to view all of the images in this group as a slideshow. The user may also choose to view any single image from the group.

The photo thumbnail collections 93A and 93B may be particularly useful in cases where the appliance user does not bother to enter specific names for his or her digital images, but instead the particular images are identified only by the nomenclature supplied by a digital camera in the course of taking a digital photograph, or supplied by a film processor in the course of returning non-digital photographs on a digital medium. Such nomenclature normally may consist of only a number.

If an image of the photo thumbnail collections 93A or 93B is selected, it will be displayed on the display of the processor-based appliance immediately. In another embodiment, the files represented by photo thumbnail collections 93A and 93B could be any other type of digital media, such as audio or video files.

Although a 3-level display of menu hierarchy items has been shown and described, in other embodiments more or fewer levels could be used. The appropriate number of menu levels to display will vary with the display size and resolution, selected fonts, and other appliance variables. In some embodiments, the number of levels in the overall menu system of the appliance could match the number of levels established by the user on the host.

Figure 7:
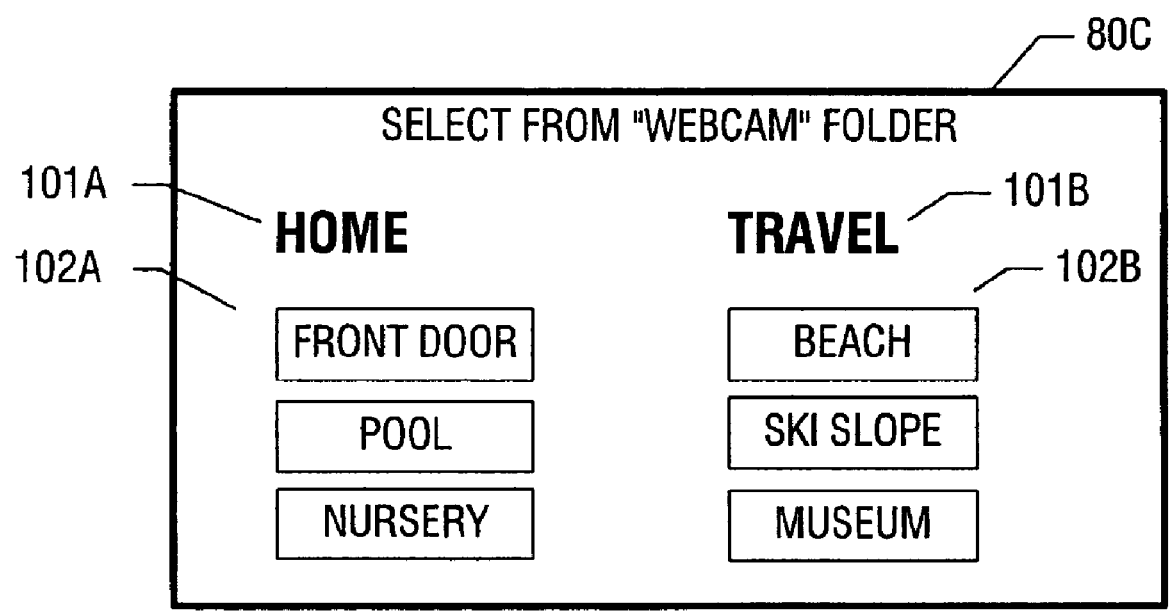
FIG. 7 illustrates a depiction of sub-menus within the "Webcam" folder of the menu illustrated in FIG. 5.

FIG. 7 illustrates a depiction 80C of sub-menus within the "Webcam" folder 86C of menu 80A illustrated in FIG. 5. For example, Webcam folder 86C comprises a "Home" heading 101A and a "Travel" heading 101B. Under the Home heading 101A are listed various sub-menu items 102A, such as "Front Door", "Pool", and "Nursery". Under the Travel heading 101B are listed other sub-menu items 102B, such as "Beach", "Ski Slope", and "Museum".

Also, Web sites such as those having Webcams may provide periodically updated images. In such case, whenever the appliance user selects a particular source, that source may then be accessed for new available image files. Those image files may then be downloaded to the host 20 and ultimately transferred to the processor-based appliance 10. The access may be automatically periodically performed in one embodiment.

Regarding Webcams, the benefits to appliance users are the periodically occurring image updates conveying the passage of time throughout the day and the ability to have a virtual window on another place in the world, as provided by a beach or ski resort Webcam, for example. The user may select one of these digital media sources from the menu and then enjoy watching the images of that locale on his or her DPF throughout the day.

Figure 8:
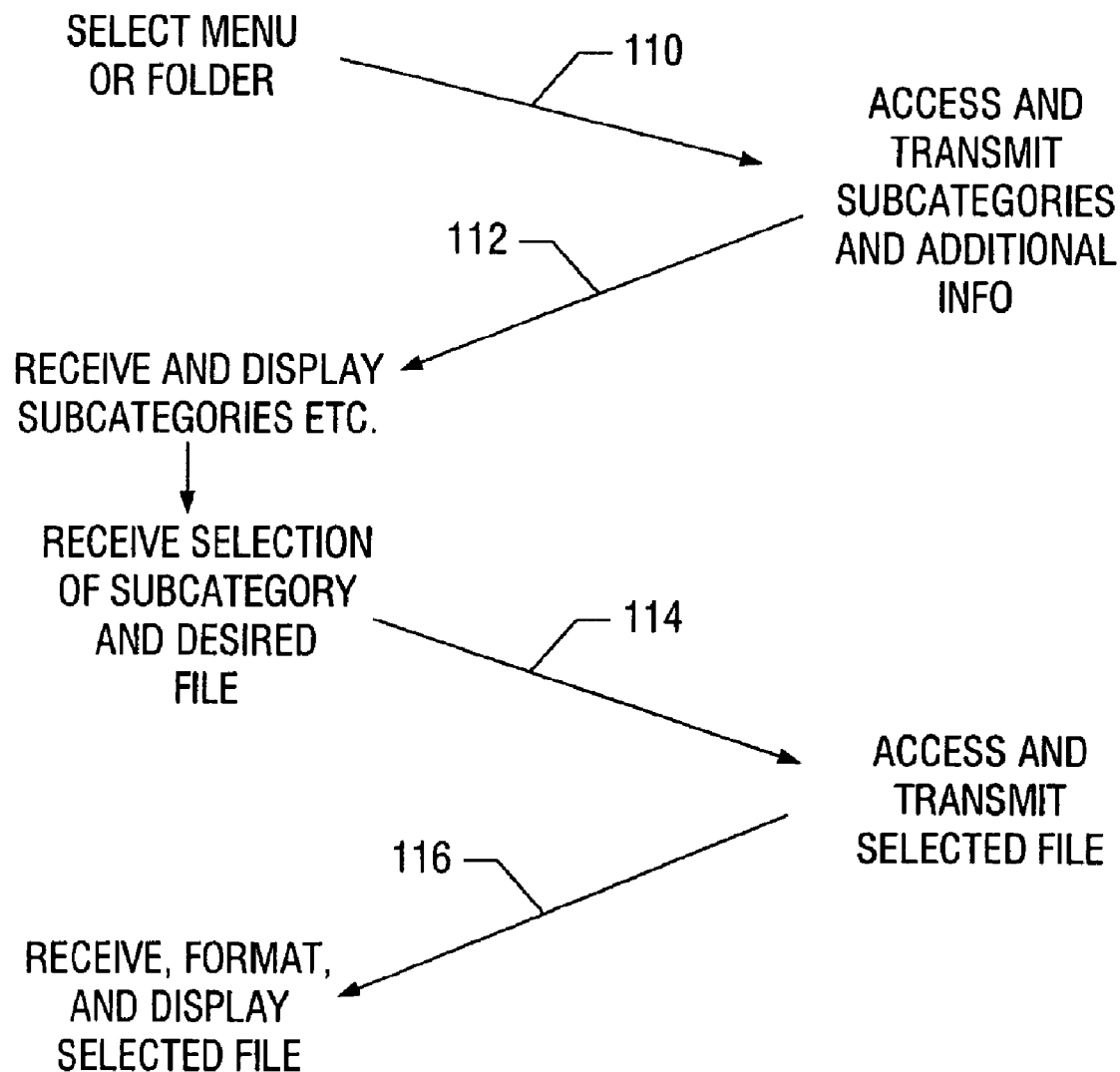
FIG. 8 is a communications diagram showing a communications sequence between a processor-based appliance and a host, in accordance with an embodiment of the present invention.

FIG. 8 is a communications diagram showing a communications sequence between a processor-based appliance and a host, in accordance with an embodiment of the present invention. The following description of FIG. 8 will also refer to processor-based appliance 10 and host 20 previously described regarding FIG. 1, as well as to the menu hierarchy described regarding FIGS. 5-7.

In a preferred embodiment, the appliance initially defaults on power-up to display or otherwise render its local cache of content. In the case of a digital picture frame, this includes displaying the locally stored digital images sequentially at full resolution. In the case of an electronic book, the appliance could default to render the text from the most recent page viewed in the last use session.

When the user desires to change the content being rendered, he or she may use the buttons or remote control to indicate this to the appliance 10. Upon this indication, the appliance 10 may display a selection option menu. The user may proceed to select a menu or folder at any level in the file hierarchy.

As represented by arrow 110, selections are conveyed from the appliance to the host 20. The transmitted request may contain information regarding the selected menu entry and may include additional information about the items expected in return. For example, a parameter may specify which page or section of the menu information to exchange. For example, if the sub-menu selection listing were 500 items long, not only would the list take time to download, it may be unmanageable to view. The additional parameter may enable the menu to be divided into predetermined, reasonably sized pages.

The host 20 examines its file system via the pathname associated with the menu item communicated. If the menu item is a storage system folder name, the host proceeds to gather the text strings that title subcategories of information within the selected folder or menu. If the appliance registration includes pagination formatting, the host may format the sub-menu items into multiple smaller groups for transmission to the appliance. This overcomes limitations of display space at the appliance. The appliance may also have a preferred language noted in its registration information. If this is the case, menu information may be translated by the host. Once the sub-menu information is ready, the host 20 sends such information to the appliance 10, as represented by arrow 112.

Prior to the host 20 beginning the transfer of the response with requested information to the appliance 10, the host 20 may perform additional routines that format the information for the appliance's graphical user interface. This is valuable, because the resources and computing capacity of the host exceeds that of the appliance. This division of labor enables the appliance to be manufactured for lower cost.

The appliance 10 receives and displays the list of menus or sub-menus as indicated by arrow 112. The appliance 10 then awaits user selection of an appropriate item from the menu, such as a desired file.

An entry may then be transmitted to the host 20 from the appliance 10 as indicated by arrow 114. The host 20 then accesses and transmits the selected file as indicated by arrow 116. The appliance 10 then receives, formats, and displays the selected file. For expedient communication and efficiency, in one embodiment the format of the user selections to the host may comprise simple indications of which menu column and row were selected. The host may be relied upon to interpret the selection appropriately.

Figure 9:
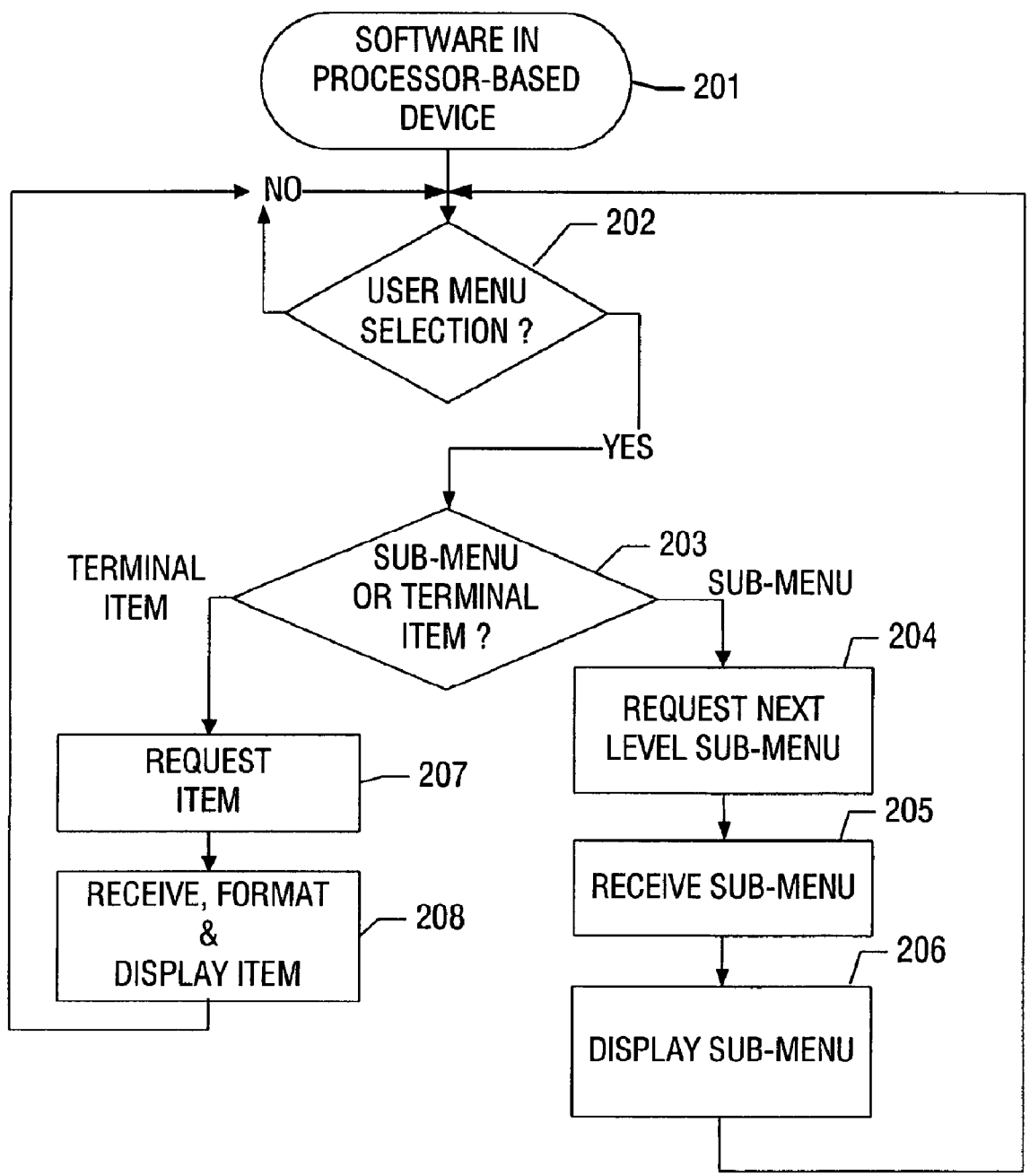
FIG. 9 is a flow diagram illustrating an exemplary method to select a menu item on a processor-based appliance, in accordance with an embodiment of the present invention.

FIG. 9 is a flow diagram illustrating an exemplary method 201 to select a menu item on a processor-based appliance, in accordance with an embodiment of the present invention.

At 202, a determination is made whether the user has made a menu selection. If so, the method goes to 203; otherwise, the method loops back to the beginning of 202.

At 203, a check determines whether a sub-menu or "terminal item" was selected. A menu item is a terminal item if the hierarchy path for the next level down is the empty set. If a terminal item was selected, the method goes to 207; if a sub-menu item was selected, the method goes to 204. A terminal item, also referred to herein as a "digital media content item", is the lowest level of the file hierarchy and usually corresponds to a digital media file such as, but not limited to, a digital picture, video clip, music track, or literary document. For example, referring to FIG. 6, the appliance user may click on one of the individual photo thumbnails from thumbnail collections 93A or 93B to select the corresponding full-size and full-resolution digital picture.

At 204, if a sub-menu item was selected, the appliance 10 requests such submenu item from the host 20.

At 205, the appliance 10 receives the next level sub-menu item from the host 20.

At 206, the appliance 10 displays the sub-menu items to the user. For example, if at 204 the user had selected the "Pets" folder 84C in FIG. 5, then submenus in the form of thumbnail collections 93A and 93B under the headings "Fido" 91A and "Garfield" 91B, respectively, would be displayed as indicated in FIG. 6. Following 206, the method loops back to the beginning of 202 to await another user selection.

As illustrated by the examples appearing in FIGS. 5-7, both terminal items and menu items (at any level) can be represented by an abstraction on the appliance's display and/or audio renderer. The abstraction can be an icon, a photo thumbnail, a representation of a CD cover, a labeled menu box (e.g. "Neighbors" 85C, FIG. 5), a tone or melody, a spoken word or sequence of words, or the like. The abstraction is part of the GUI and enables the appliance user to see and/or hear various menu choices and to select from the choices. The abstraction is rendered into a human-perceivable form by the appliance's visual display renderer (17, FIG. 2) and/or audio renderer (18, FIG. 2).

At 207, the selected terminal item is requested from host 20. Each terminal item, such as a digital picture, is uniquely associated with a suitable digital media file by means of a host pathname identifier, which can be a unique file name and which may also comprise a date and time stamp, as well as any other appropriate information.

At 208, the terminal item is received from host 20, and it may be optionally decompressed if necessary. It is then rendered on the appliance 10.

Figure 10:
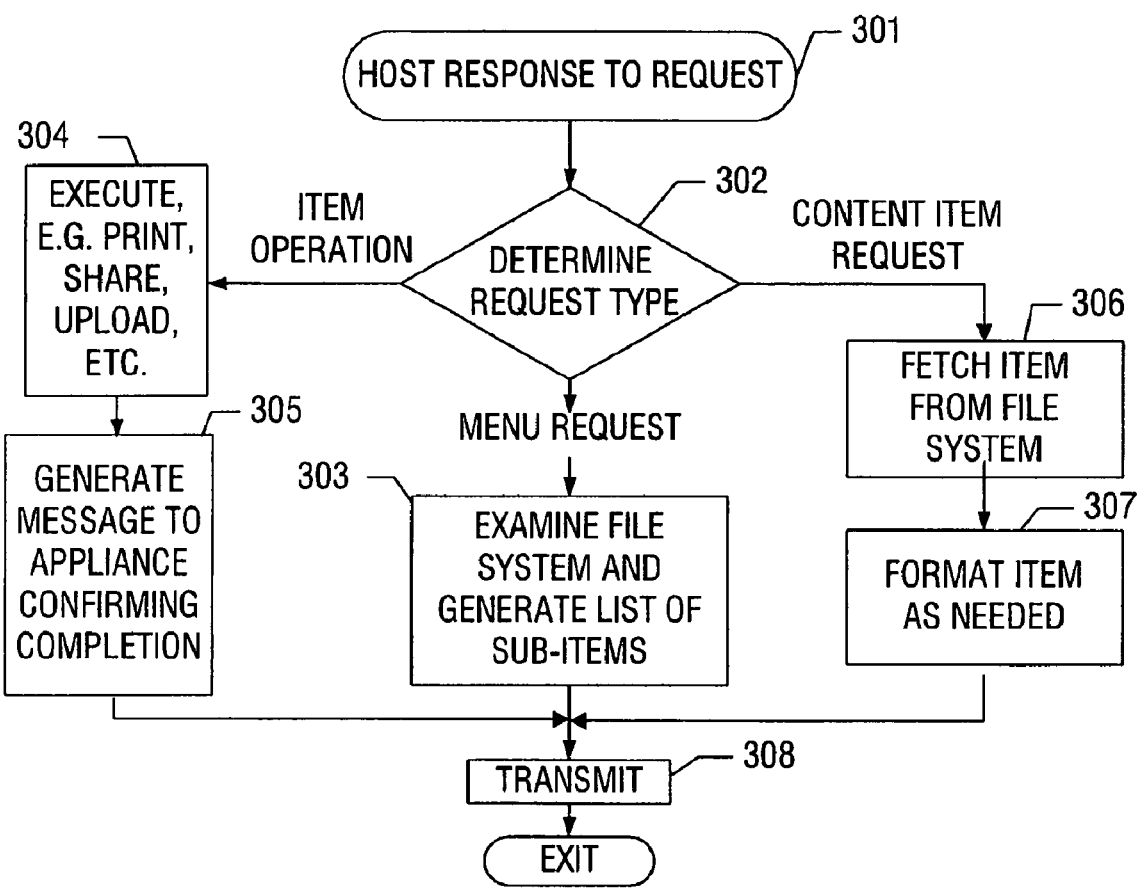
FIG. 10 is a flow diagram illustrating an exemplary method for a host to respond to a request from a processor-based appliance, in accordance with an embodiment of the present invention.

FIG. 10 is a flow diagram illustrating an exemplary method 301 for a host to respond to a request from a processor-based appliance, in accordance with an embodiment of the present invention. Through this method, an appliance user may conveniently perform many types of file operations. As merely one example, the appliance user may request that the host queue a specific photo file to a printer, waiting until the user loads photo paper into the printer. The appliance user may also send photos to a buddy for sharing. The appliance user may also request that the host send a menu of stored media files to the processor-based appliance, from which the appliance user may select one or more files for any desired purpose, such as a file to be rendered on the processor-based appliance.

At 302, a determination is made as to whether the request from the appliance is for an item operation, a menu request, or for a content item. For efficiency, each of these operations has an established command code. The command codes for these various operations can be an established part of the host-appliance communication protocol.

If the appliance request is for an item operation, the method goes to 304; if it is for a menu request, the method goes to 303; if it is for a content item request, it goes to 306.

An "item operation" is an operation that the host performs at the request of the appliance. Generally, an item operation is a unique operation that the host can perform, and that the appliance may not be able to perform. Examples include printing a file, transmitting a file to a buddy, uploading a file to the host for archival storage, and so forth.

At 304, the host performs the requested item operation(s).

At 305, the host generates a message to the appliance confirming completion of the requested item operation(s), and the message is subsequently transmitted to the appliance at 308. The appliance may give the user a confirmation indication.

At 303, the host examines its file system and generates a list of information items that will be used to populate the sub-menu, depending upon the selection made at the processor-based appliance. The sub-items, which may comprise text strings describing storage hierarchy levels, photo thumbnails of digital media within a level, and so forth, are transmitted to the appliance at 308. The appliance prepares the next user selection display by populating the menu structure with the newly received sub-menu items.

At 306, the host fetches the requested content item from its file system.

At 307, the host optionally formats the requested content item if necessary to render it properly, given the registered characteristics of the appliance. For example, a multi-megapixel digital image may be down-sampled to match the appliance's display resolution and color-corrected to fit the appliance's color gamut. The requested content item is then transmitted to the appliance at 308.

Figure 11:
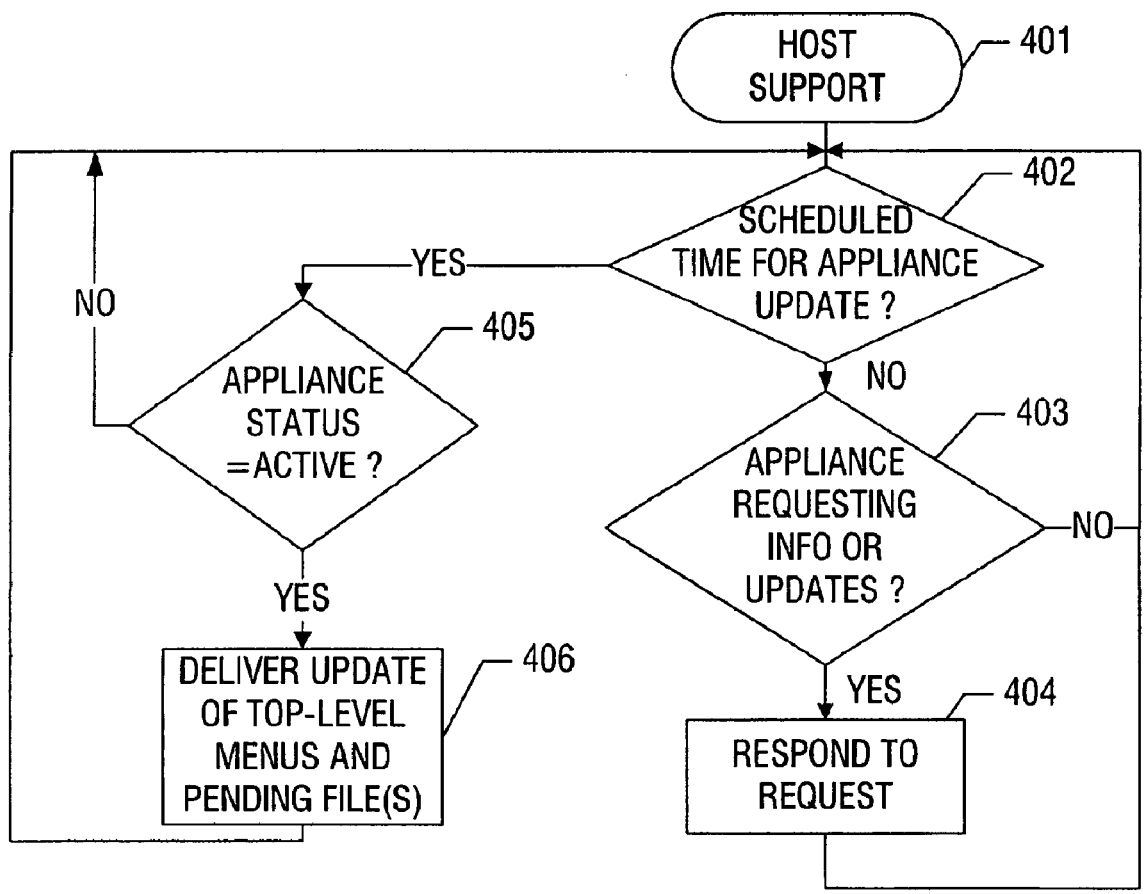
FIG. 11 is a flow diagram illustrating an exemplary method for a host to provide support to and/or to update a processor-based appliance, in accordance with an embodiment of the present invention.

FIG. 11 is a flow diagram illustrating an exemplary method 401 for a host to provide support to and/or to update a processor-based appliance, in accordance with an embodiment of the present invention.

In 402, a determination is made whether it is a scheduled time to update the content and menus for an appliance. If so, the method goes to 405; otherwise, it goes to 403. The user can schedule the host to update the appliance at any desired periodic interval, at specified clock times, or according to any other type of time schedule. The host application supporting the appliance uses host system resources to maintain a registration data record for each registered appliance, including preferred update schedule information. The registration process is described more fully in a forthcoming section of the written description.

At 403, a determination is made whether the appliance is requesting information or updates. If so, the method goes to 404; otherwise, it loops back to the beginning of 402.

At 404, the host responds to the appliance's request for information or an update. Such information can be of any type, such as the current date, time of day, a host locale identifier that identifies its physical location (e.g. city), accessible image galleries, picture-sharing buddy lists, a software update, and the like.

At 405, when it is time to deliver a scheduled update of content and menu items to an appliance, a determination is made whether the appliance's status is "Active". (The method for determining the appliance's state is described in detail in the forthcoming description of FIG. 12.) If so, the method proceeds to 406; otherwise, it loops back to the beginning of 402.

At 406, the host delivers an update of top-level menu, e.g. menu categories such as 82A-82C in FIG. 5, if there has been any change in such top-level menu since the previous update. Such change could result, for example, if the user has recently added or deleted a category from his or her digital media archive file hierarchy on the host. Also at 406, the host can deliver new digital media files to the appliance.

Figure 12A:
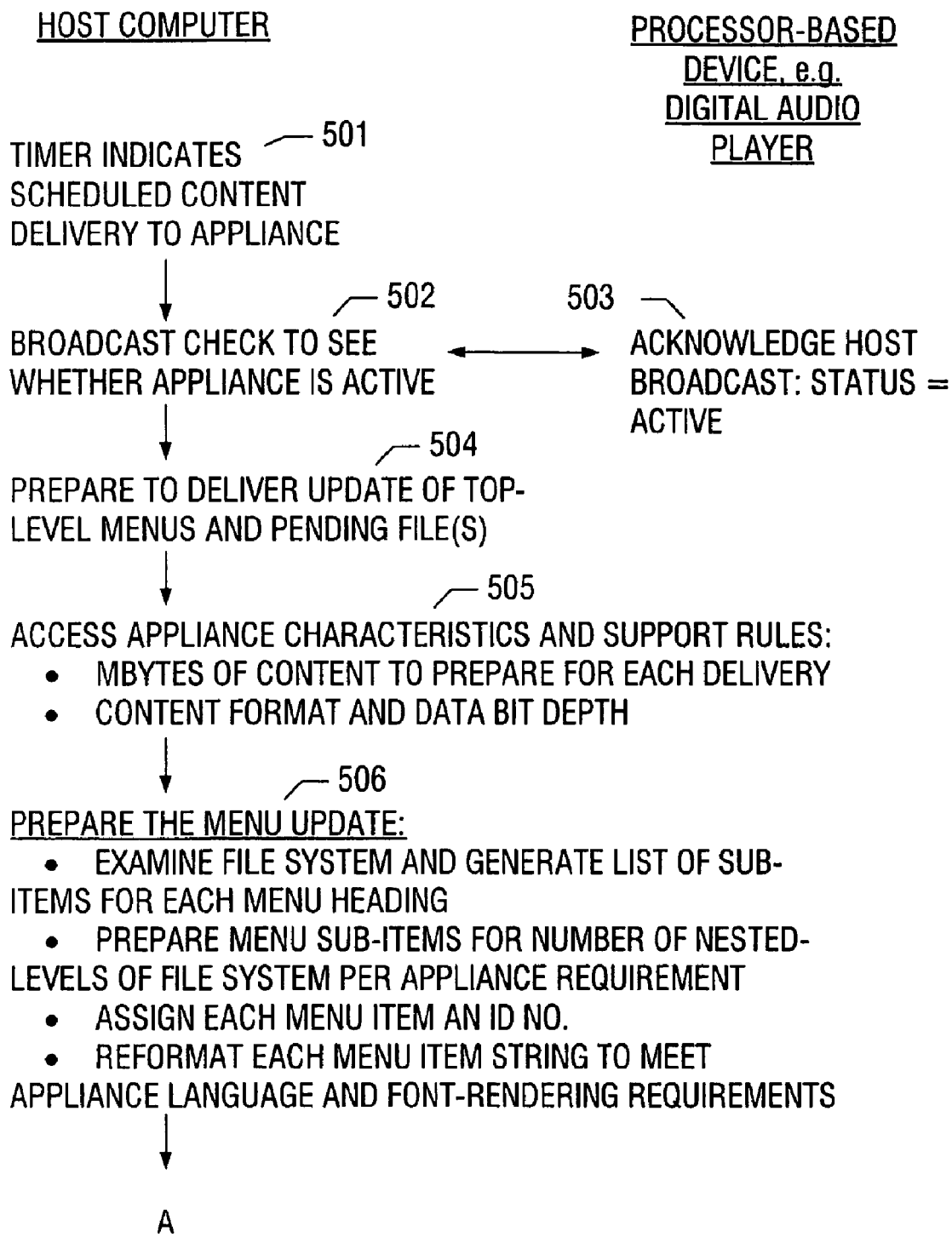
FIGS. 12A and 12B together constitute a combined flow diagram and communications diagram illustrating an exemplary method for a host to update a processor-based appliance, in accordance with an embodiment of the present invention.
Figure 12B:
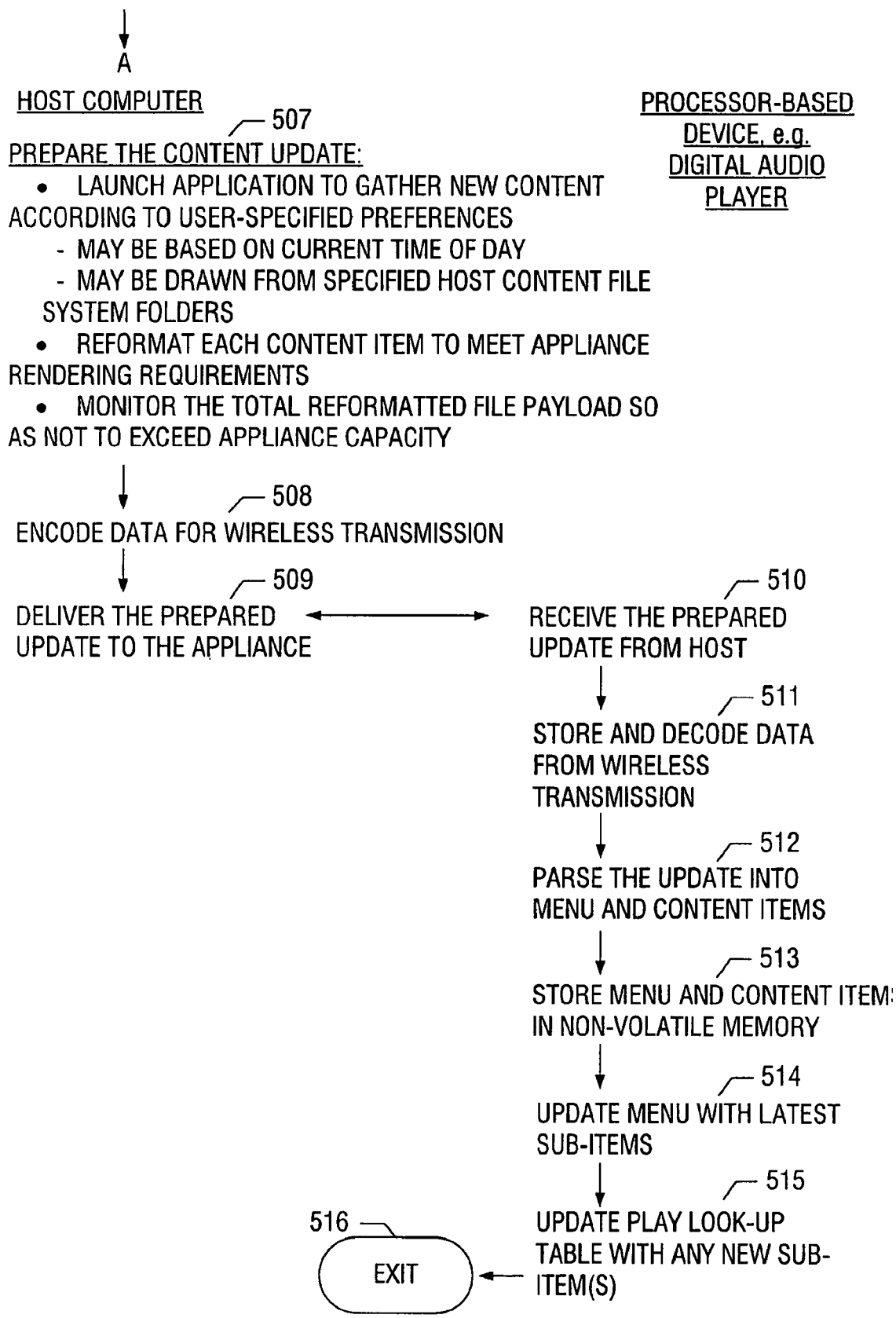

FIGS. 12A and 12B together constitute a combined flow diagram and communications diagram illustrating an exemplary method for a host to update a processor-based appliance, such as a digital audio player, in accordance with an embodiment of the present invention. This update sequence expands slightly upon that shown in FIG. 11.

At 501, a host system resource such as a timer indicates that it is time for the host to deliver menu items or content items to an appliance, such as a digital audio player in this example. However, with only minor modifications, the appliance could be a digital picture frame, PDA, or any other processor-based device.

At 502, the host broadcasts a check to see whether this appliance is active. This is commonly done in the art by means of the host periodically broadcasting a request for response. Each appliance is polled to check whether it is still able to participate fully. If so, at 503 the appliance acknowledges the host broadcast by responding to the host that it is active.

At 504, the host begins to prepare an update of any changes to the top-level menus, any pending files that have been received for but that have not yet been delivered to the appliance, and optionally, automatically selects a new collection of digital media for the appliance. The latter capability is described further in FIGS. 18 and 19.

At 505, the host accesses information from within its local memory regarding particular characteristics and support rules of the appliance. These may include, for example, the maximum storage and formatting requirements of the appliance. The host may thus calculate the maximum size, content format, data bit depth, and other characteristics of each delivery to the appliance.

At 506, in a preferred embodiment, the host prepares a top-level menu update. This may involve a variety of operations. For example, the host may examine its file system and generate a list of sub-items for each menu heading or category heading. The host may prepare menu sub-items for a number of nested levels of the file system, conforming to the stored registration parameters defining the capabilities and configuration of the appliance. The host may assign each menu item an identifier number. The host may reformat each menu item string or group to meet language and font-rendering requirements of the appliance. The host may also reformat each visible and audible menu item to conform to the appliance's rendering capabilities. For example, album cover thumbnails may be converted to JPEG (Joint Photographic Experts Group) format and music tracks to MP3 (Moving Picture Experts Group, audio layer 3) format.

At 507, the host may determine the byte payload size of digital media content waiting to be delivered to the appliance. The waiting content may be user-selected at the host, received from another user's computing device, or gathered from the archive on behalf of the appliance. The host may launch an application to gather new content items according to user-specified preferences that are stored within the host. The content selections update may depend upon the current time of day; for example, quiet songs could be selected for the user in the morning and more energetic songs could be selected for an update later in the day.

The content item(s) can be retrieved from specified content file system folders on the host. The host, if necessary, can reformat each content item to meet the rendering requirements of the requesting appliance. For example, an MP3 player may require that all 16-bit songs be converted to 12-bit files and to MP3 format prior to transmission. As another example, a bitmap file may be converted to a JPEG format prior to transmission. As a further example, large image files, such as video files, may be divided into more readily transmissible portions.

The host may monitor the total size of the reformatted content payload so that it doesn't exceed the storage capacity of the appliance, and so that it is transmitted at a rate not to exceed the transmission bandwidth. In another embodiment, reformatting could be performed by the appliance. However, it is generally preferred to divide the workload, so that the appliance is required to do only minimal content processing, such as decompressing transmissions. This gives the benefits of faster responses to user requests and minimizes appliance cost.

In some embodiments, the host has greater storage and processing resources than an associated appliance, so the host can take on such tasks as storing large quantities of media files and properly formatting such media files and menu information for display on the appliance. This division of workload or responsibility enables the appliance to contain fewer storage, processing, and possibly other resources, so that it can be manufactured at a substantially lower cost than the host.

At 508, the host encodes the information to be wirelessly transmitted.

At 509, the host transmits the prepared update to the appliance.

At 510, the appliance, e.g. a digital audio player or other processor-based device, receives the prepared update from the host.

At 511, the appliance stores and decodes the update data that has been transmitted, e.g. wirelessly, from the host.

At 512, the appliance parses the update into menu items and content items.

At 513, the appliance stores the menu items and content items in non-volatile memory.

At 514, the appliance updates its menu with the latest menu items, such as text strings conveying names of archive categories, thumbnail images representing digital content items, or other representations, such as icons, of digital content menu items, and sub-menu items.

At 515, the appliance may update a play look-up table, e.g. located within the appliance, with any new sub-item(s) received from the host. The play look-up table is a play list or sequence of digital media files in a play order. For example, if the appliance is a digital audio player, the play list comprises audio files; if the appliance is a DPF, the play list comprises digital photos. The play list defines the order in which digital media files are to be rendered on an appliance. The play list can optionally include transition effects, as well as visual and/or audio captions to identify files as they are rendered. The play list also includes the appliance's local memory address where each digital content item has been stored.

As just one example, the method shown in FIGS. 12A-12B could be used by an electronic music player in an automobile that communicates with a host entertainment system within the automobile, or with an external wireless host, in order to obtain a new download of music files.

The method finishes at 516.

Figure 13A:
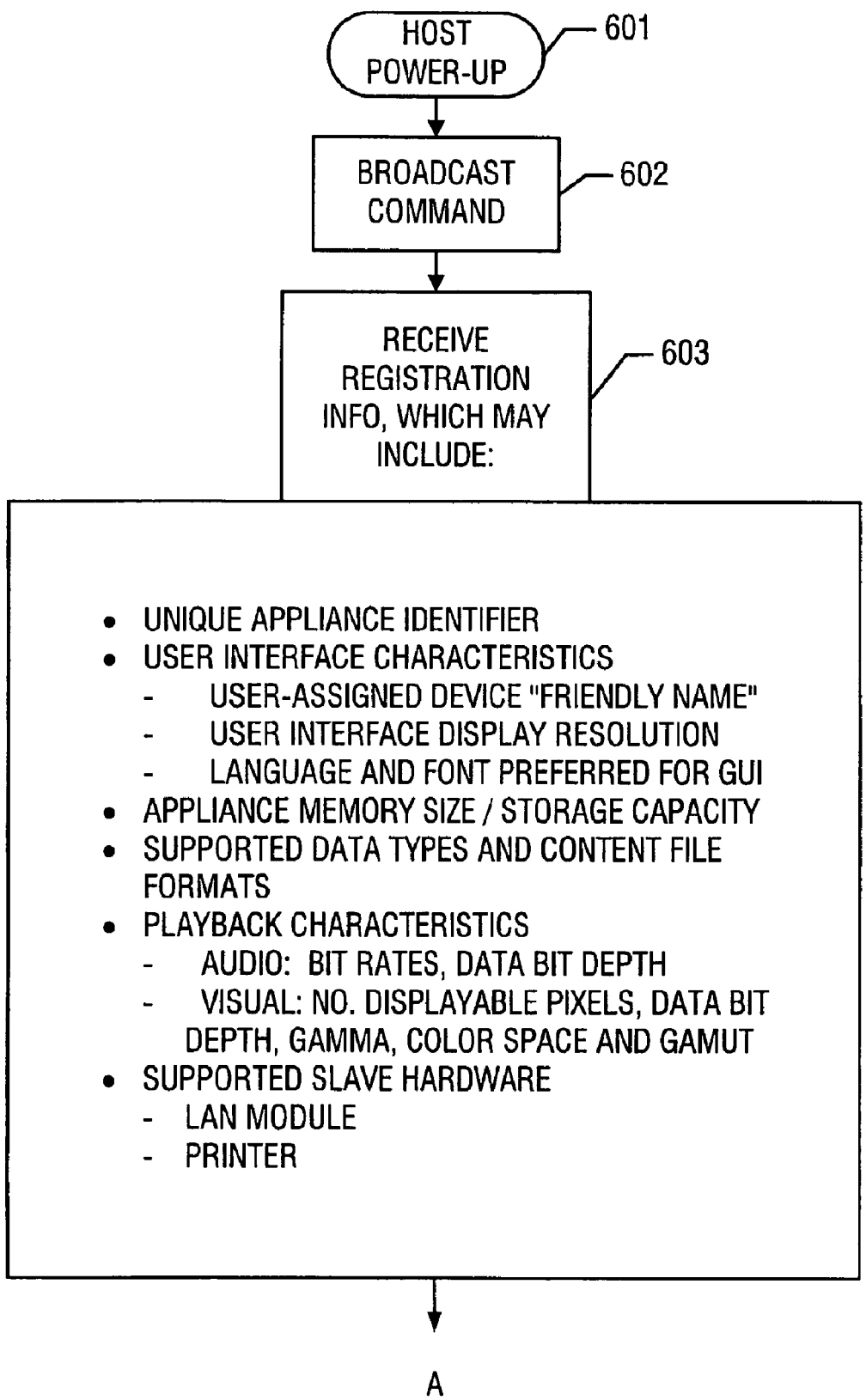
FIGS. 13A and 13B together constitute a combined flow diagram illustrating an exemplary method for a host to power up, in accordance with an embodiment of the present invention.
Figure 13B:
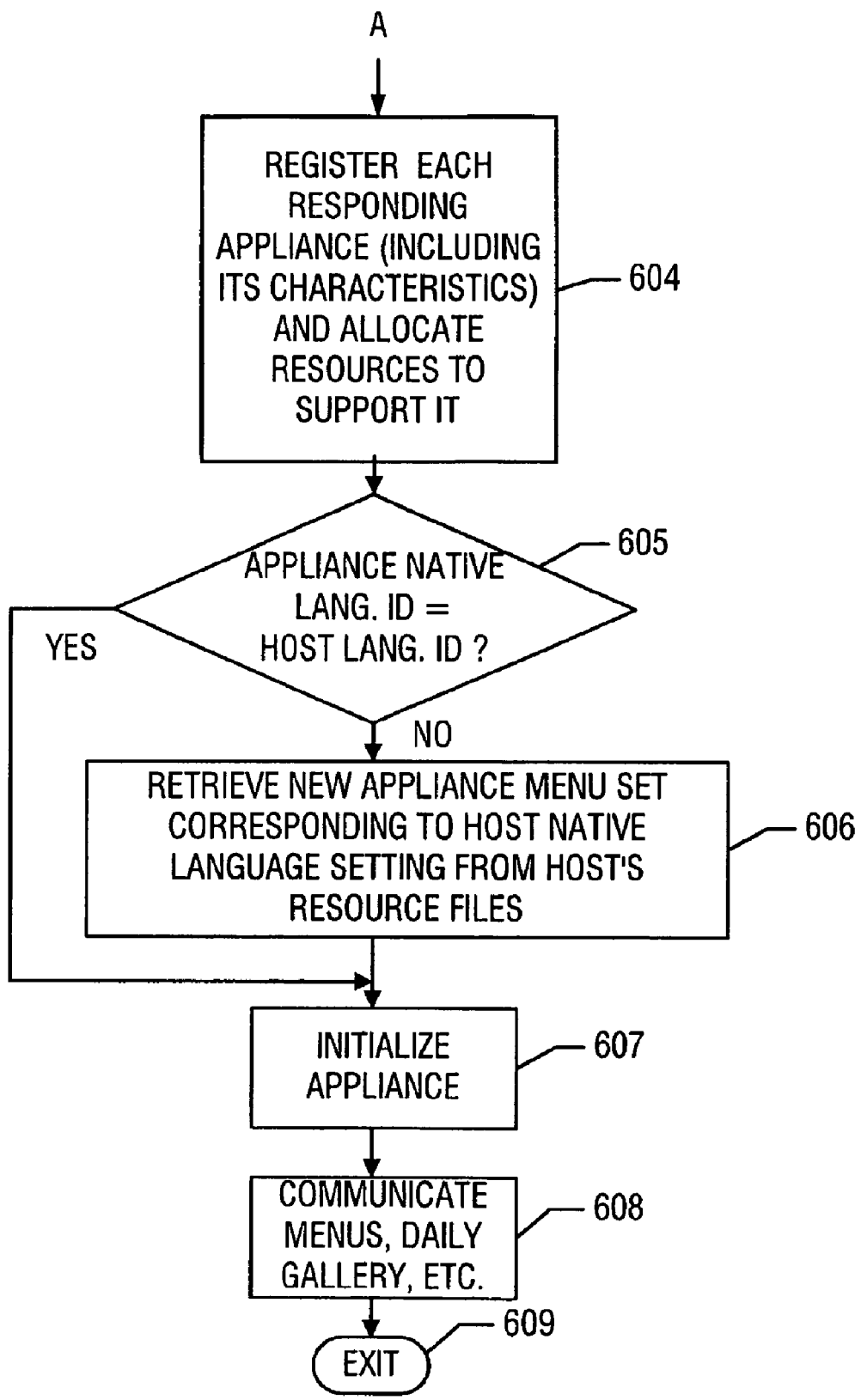

FIGS. 13A and 13B together constitute a combined flow diagram illustrating an exemplary method 601 for a host to power up, in accordance with an embodiment of the present invention.

At 602, when the host is turned on, it broadcasts a polling inquiry or command for any appliances in its vicinity to respond and to register with it.

At 603, the host receives back from each appliance various registration information, which can include a wide variety of information. Such information may include a unique appliance identifier (ID) for each appliance that responds. The information may include user interface characteristics, such as a user-assigned "friendly name" for the user's appliance, the display resolution of the appliance, and a preferred language and font for the appliance's general user interface (GUI).

The information may also include the memory size or other indication of storage capacity of the appliance. The information may include a list of the data types and content file formats that the appliance supports.

The information may further include playback characteristics. For audio files, this may include the bit rates and data bit depth. For visual files, this may include the number of displayable pixels, data bit depth, gamma, color space and gamut.

The information may also include one or more hardware support descriptors comprising information about any supported slave hardware, such as a local area network (LAN) module, a printer, and the like.

The appliance characteristics are used by the host in tailoring updates to the appliance. For example, when digital pictures are received by the host in an e-mail, and they are in a specific format, such as the JPEG file extension, they may be automatically distributed to the appliance. Similarly, when downloaded software is received by the host, such as video-on-demand software that is specially adapted for the appliance, such software may be automatically forwarded to the appliance. As another example, downloaded software may be specifically adapted for a specific processor, and that may also be indicated with the download. Because the host knows the processor of the appliance, the host may automatically forward the software to the appliance.

As yet another example, one of the appliance characteristics stored by the host can be a preferred language identifier that indicates in what natural language (e.g. English, French, etc.) the appliance user prefers to read text items, such as menu information. When the host updates the appliance, the host can retrieve and provide text information, such as a menu set, in the preferred language of each appliance with which it is communicating.

In some embodiments, the appliance automatically adopts the pre-selected hierarchy in organization of menus and files that exist on the host. This avoids the necessity to re-specify the hierarchy, menu structure, and the like, from the appliance. Thus, generally, the appliance will use the same number of hierarchical levels, the same hierarchical descriptors and titles, and the like, as the host.

At 604, the host registers each responding appliance, including its unique ID number and its particular characteristics, and the host allocates resources to support each responding appliance. If the responding appliance has previously been registered by the host, the host records that such appliance is currently active.

At 605, a determination is made whether a native language identifier for the appliance is the same as the language identifier for the host. If so, the method goes to 607; if not, it goes to 606.

At 606, the host retrieves a new appliance menu set corresponding to the host's native language setting from the host's resource files.

At 607, the host initializes the appliance.

At 608, the host communicates menus, a daily gallery or play list, and any other like information to the newly registering appliance. Such information may include time of day, current date, locale identifier or physical location of the host (e.g. city), and the like.

In one embodiment, new multi-megapixel resolution digital pictures are not necessarily transmitted to the appliance during updates, because it is a more efficient use of transmission bandwidth to send only the highest resolution the appliance can utilize. It is preferable to down-sample higher resolution images. Also, oversize image data unnecessarily consumes the local storage resources of the appliance.

Update information may be communicated both upon request of the appliance and at periodic intervals, e.g. hourly or daily. The gallery or play list can be rendered on the appliance, including at times when the host may be powered off or out of range. The method ends at 609.

Figure 14:
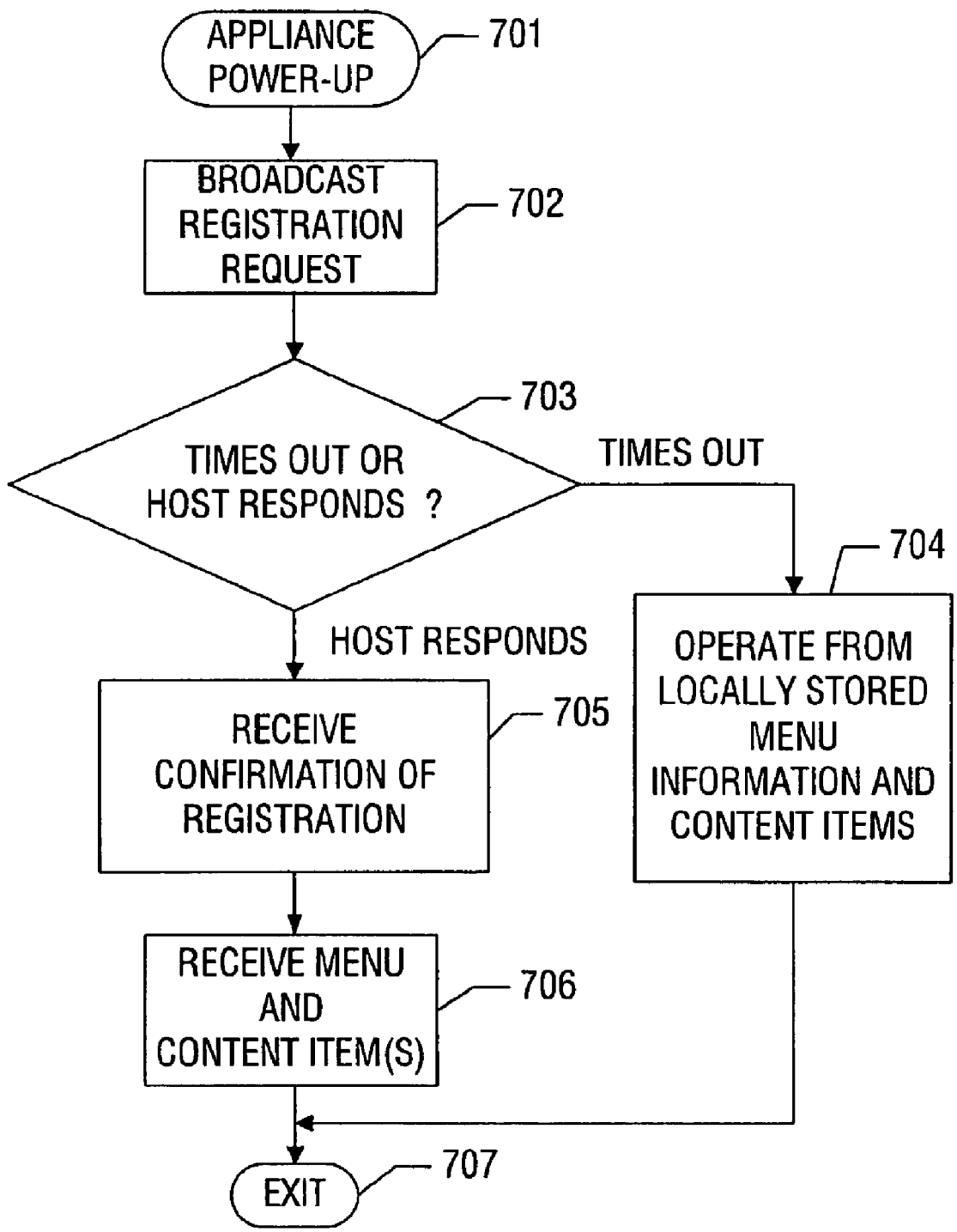
FIG. 14 is a flow diagram illustrating an exemplary method for a processor-based appliance to power up, in accordance with an embodiment of the present invention.

FIG. 14 is a flow diagram illustrating an exemplary method 701 for a processor-based appliance to power up, in accordance with an embodiment of the present invention.

At 702, the appliance broadcasts a registration request to see whether a host is within range and is powered on.

At 703, a determination is made whether the host has responded within a specified time. If so, the method goes to 705; if not, it goes to 704.

At 705, the appliance receives confirmation of registration from the host. If the particular appliance has not previously registered with this host, then it can register with the host in a manner similar to that described above regarding FIGS. 13A-13B.

At 706, the appliance receives one or more menu items and/or one or more content items.

At 704, the appliance operates from its local store of menu information and content items. The method ends at 707.

Figure 15:
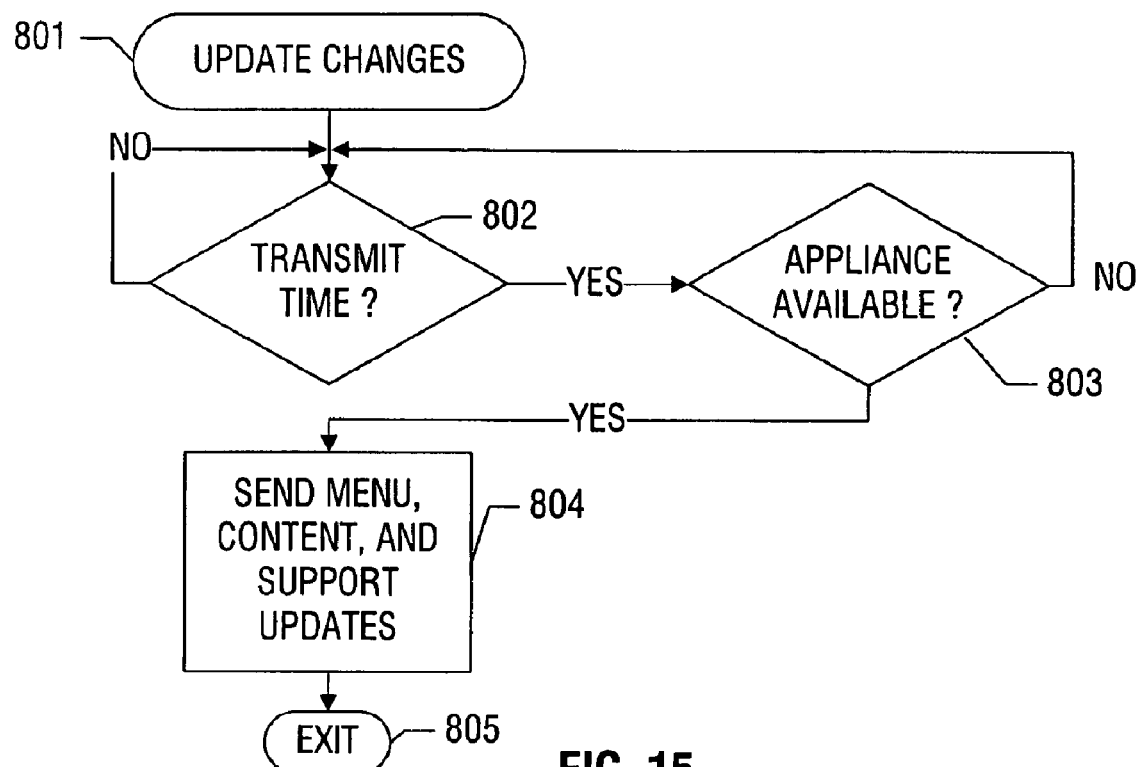
FIG. 15 is a flow diagram illustrating an exemplary method for a host to synchronize with a processor-based appliance, in accordance with an embodiment of the present invention.

FIG. 15 is a flow diagram illustrating an exemplary method 801 for a host to synchronize with a processor-based appliance, in accordance with an embodiment of the present invention. As a result of synchronization, the host updates the appliance with any menu or content item changes residing on the host. Such updates can occur automatically or upon command from the host or appliance.

At 802, a determination is made whether a scheduled transmit time has occurred. If so, the method goes to 803; otherwise, it loops back to the beginning of 802.

At 803, a determination is made whether the appliance is turned on and within range. If so, the method goes to 804; otherwise, it loops back to the start of 802.

At 804, the host sends any updates to menu items, content items, or support items. Support items can include a new software or driver release to provide one or more functions or characteristics that the appliance did not previously have, or an updated version thereof.

A new function could be accompanied by a new menu item for display on the appliance, e.g. a printing icon denoting a printing action that the user can command to occur on a selected file at the host. The host may deliver a new menu template to support a new function or capability, thereby altering or expanding the feature set for the user automatically. This capability overcomes many of the existing limitations of product shipping readiness and competitiveness for manufacturers. The method exits at 805.

Figure 16:
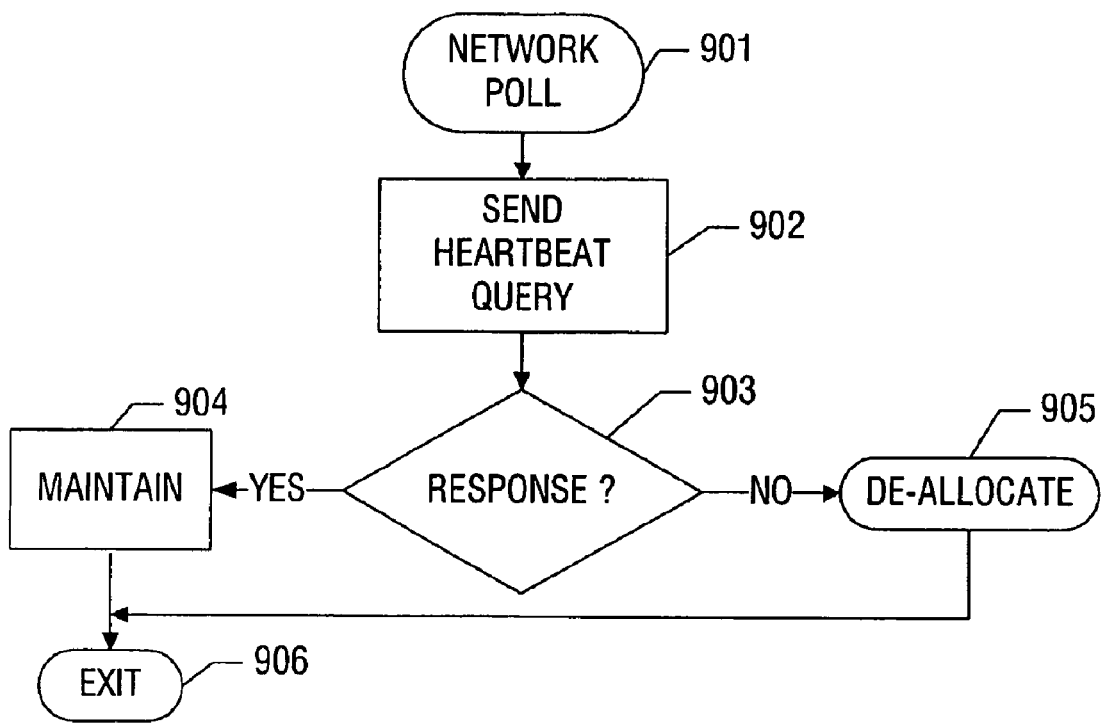
FIG. 16 is a flow diagram illustrating an exemplary method for a host to poll one or more processor-based appliances, in accordance with an embodiment of the present invention.

FIG. 16 is a flow diagram illustrating an exemplary method 901 for a host to poll one or more processor-based appliances, in accordance with an embodiment of the present invention. A purpose of such polling is to determine whether an appliance is powered on and within range. When an appliance is powered down, it can send an appropriate signal to its host. However, the appliance user could possibly carry an appliance out of range of its host, so a mechanism is provided for the host to poll the status of any nearby appliance(s). In one embodiment, such polling is performed at periodic intervals by the host to determine which appliances are active in a network.

At 902, the host may automatically send a "heartbeat" query, such as a null packet, to a selected appliance, or it could broadcast such a query to any and all listening appliances, and then wait for the appliances to respond within a predetermined interval.

At 903, a determination is made whether a specific appliance has responded to the heartbeat query. If so, the method goes to 904, where the appliance is maintained as "active" on the host's registry of active appliances. This allows the responding appliance to receive periodic updates from the host.

If the appliance failed to respond, the method goes to 905, where the host de-allocates the appliance from its registry of active appliances and does not process any transmissions to such appliance until it is re-registered.

When an inactive appliance comes back on line or is within sufficient proximity to receive signals from the host, the appliance may be automatically updated the next time that the host sends out an appropriate heartbeat signal, such as in 902. Alternatively, whenever the appliance is turned on, it may broadcast a signal to the host indicating that the host should allocate resources to the processor-based appliance.

Figure 17:
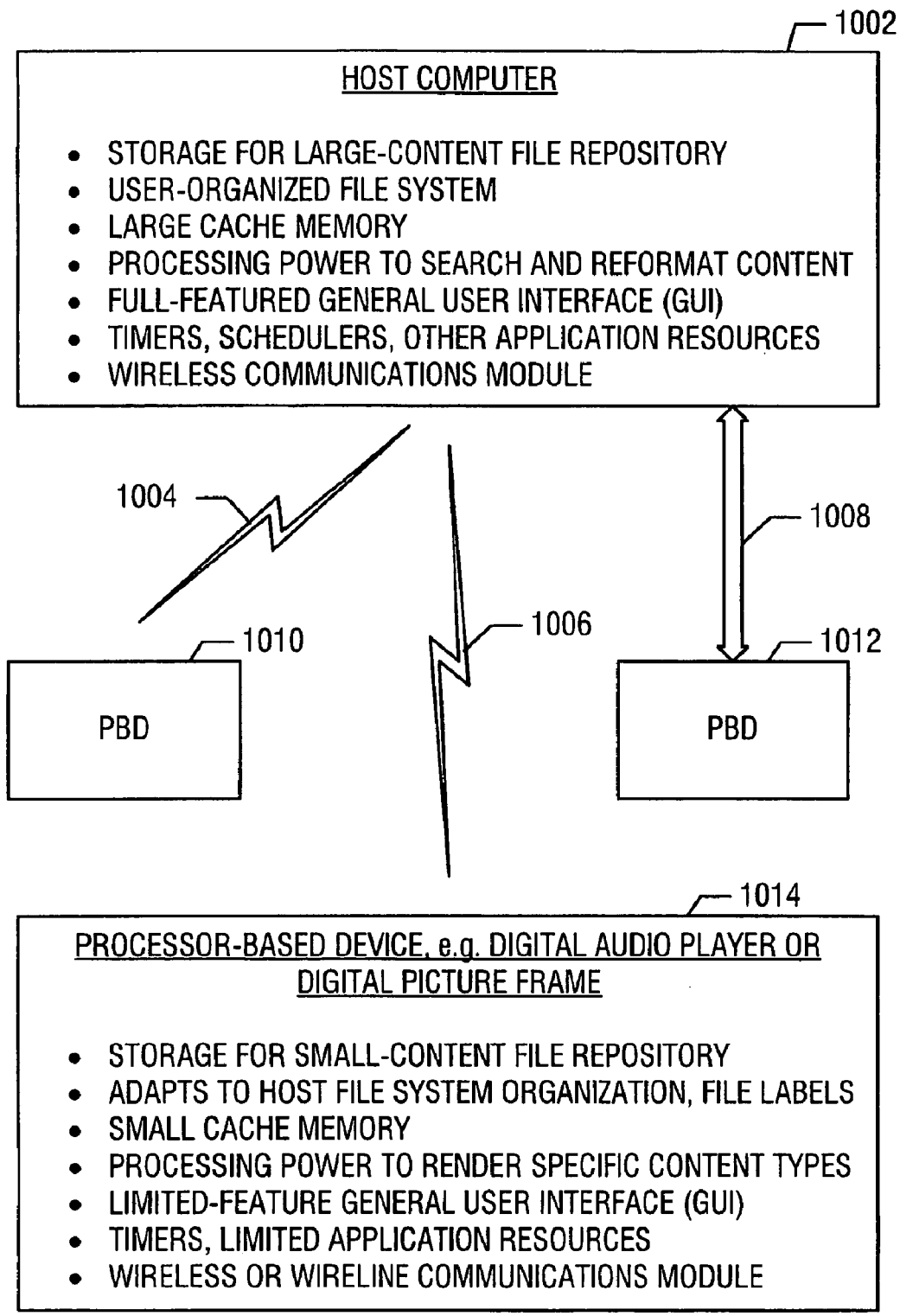
FIG. 17 is a block diagram of a network comprising a host and one or more processor-based devices or appliances, in accordance with one embodiment of the present invention.

FIG. 17 is a block diagram of a network comprising a host 1002 and one or more processor-based devices or appliances 1010, 1012, and 1014, in accordance with one embodiment of the present invention. As illustrated in FIG. 17, a host 1002 can communicate menu items and content items with one or more processor-based devices, such as appliances 1010, 1012, and 1014. Host 1002 generally comprises greater resources, and/or larger and more full-featured resources, than an individual processor-based appliance 1010, 1012, or 1014. For example, host 1002 can include storage for a large-content file repository that contains many digital media files of any type. Host 1002 can also include a file structure or system that is organized by a host user. As one example, many personal computer users use the large storage capacity of their personal computers to store digital media files, after downloading such files from the Internet, from digital cameras, or from other media players, or after receiving them via email. Computer users typically establish a preferred, customized file hierarchy on their personal computers. Embodiments of the present invention offer significant flexibility in accommodating computer users' pre-existing file hierarchies, thus providing an advantage over other products that are incapable of doing so.

Host 1002 can further comprise a large cache memory. Host 1002 can also include fairly significant processing power to search for and reformat digital content items, whether in its local memory or on a network such as the Internet. Host 1002 can also include a full-featured general user interface (GUI), as well as a number of timers, schedulers, and other application resources. Host 1002 may also include a wireless communications module, including for example a radio-frequency (RF) or infra-red (IR) transceiver.

In the example shown in FIG. 17, host 1002 can communicate wirelessly with appliance 1010 and appliance 1014 via wireless links 1004 and 1006, respectively. Host 1002 can communicate via a cable or wire 1008 with appliance 1012.

An appliance generally comprises fewer resources, and/or smaller and less full-featured resources, than a host. For example, appliance 1014 can include storage for a small-content file repository that may contain a limited number of digital media files. The file system organization of appliance 1014 may adapt to that of the host, including the file names or labels of the host. Appliance 1014 could have a small cache memory and only sufficient processing power to render specific content types. For example, a DPF could have a processor that renders only digital photo files. Appliance 1014 could have a limited-feature GUI, and other rather limited application resources. Appliance 1014 may also include wireless or wireline communications modules, including for example a radio-frequency (RF) and infrared (IR) transceivers as described previously in FIGS. 1-3.

In a network or system comprising a host computer and at least one processor-based appliance, resources can be divided in a suitable division of labor and/or partitioning of responsibility. For example, in an embodiment where the host serves as a repository for a large number of digital media files, the storage capacity of the processor-based appliances can be reduced to a reasonable capacity that can store a reasonable number of files, thus minimizing the cost and complexity of the processor-based appliances.

Automated Digital Media Archive Search and Retrieval

The foregoing description has discussed various features of processor-based appliances that can communicate with a host computer, features of the host computer, and features of a network comprising a host computer and one or more processor-based appliances, such as a DPF. The following description relates to features that enable a processor-based appliance, such as a DPF, to retrieve digital media files from a host computer archiving a plurality of digital media files according in an automated manner. The appliance user can easily set up an automated schedule of retrieving and displaying digital media files based upon a wide variety of search or selection criteria.

In one embodiment, a host computer stores a plurality of digital media files, which can be of one or more types previously mentioned, such as photo-realistic images, animations, graphic objects, audio files, etc. Images can comprise metadata that can include at least a date stamp, keywords, and other information.

The digital appliance has a maximum storage capacity, which can be expressed, for example, as a maximum combined file size or number of images to be gathered from the archive.

A search engine capability is implemented on the host computer, as well as on the processor-based appliance, to identify and retrieve images according to set rules. The rules guide the search engine, and they include such operations as matching dates, keywords, or picking digital media files at random. The rules are persistent, so that they do not require recurrent manual input from the appliance user.

While many different embodiments can be envisioned, one typical example is a consumer home personal computer ("PC") with an archive of personal images and a wireless communication path to a DPF. On the home PC, a daily task scheduler initiates the automated image retrieval function, using a search engine with persistent rules to periodically select and deliver a new set of images for display on the DPF.

Default rules may set a "window of latitude" around the PC's current date (e.g., 7 days around the current date). The search engine could retrieve all pictures taken in the same day and month fields, from previous years. For example, images of birthday parties would be displayed on this year's birthday; Christmas pictures could be retrieved and displayed in December, $4^{th}$ of July pictures in July, etc., using the date stamp currently provided for each file stored on the PC. Most operating system and/or applications currently provide a date and time stamp for every file. This automated feature enables the digital imaging archive to be enjoyed with less effort than is currently required on the part of the appliance user.

Images having other metadata can likewise be searched, such as by keywords indicating the names of people or places pictured.

Further, the search can be restricted to include or exclude particular folders of images. This enables appliance users to retrieve files from favorite image folders or categories, such as family pictures or vacation pictures.

The configurable elements of the search and retrieval process can be altered whenever the appliance user wishes to take the time. Otherwise the process will continue to retrieve and display different sets of images on a regularly scheduled basis.

According to one embodiment, the automated image retrieval function software has persistent rules storage. The rules include user-configurable defaults of archive location specification and of image metadata criteria.

Regarding archive location specification (such as file path, URI, URL, etc.), multiple archives, both local and remote from the processor-based appliance, can be co-searched. Particular galleries can be included or excluded, giving the appliance user complete control over what images will be displayed.

Image metadata criteria can include all conventional metadata types, such as date and time of image creation, whether flash was used, camera capture and compression settings, photographer, descriptive keywords, extracted feature vectors, image orientation, dominant color, etc.

In one embodiment, the process works as follows. A supervisory program calls the content-gatherer function. The execution call can specify a maximum number of images or total combined file size to return, as determined, for example, by the maximum number of bytes that are available for images on the appliance.

In one mode of operation, digital media content is selected and displayed automatically without involvement by the appliance user. If the appliance user has manually selected images for display, one type of default behavior is to deliver only the manually selected images to the display appliance. However, a user-configurable alternative is to gather additional content to augment the manual image selections. If the appliance user has selected the latter mode, the supervisory program can reduce the capacity value passed to the auto-content gatherer to accommodate the space needed for the manual image selections, and the system then collects images to fill the remaining capacity of the display.

In one embodiment, images are organized with an Extensible Markup Language (XML) database structure. The automated image retrieval search engine reads the persistent rule values and proceeds to evaluate the user-specified directories, file folders, and or URIs. A comparison is made in the specified XML fields to find matches to the search criteria. The search engine collects the XML nodes of matches, up to the desired quantity of images or bytes. The XML nodes may contain pointers to the location of matching images or binary image data itself. The supervisory function, which receives the search engine results, can then proceed to format and deliver the images.

The embodiments, above described, of an automated digital media archive search and retrieval capability, differ from known apparatus and/or methods. For example, current DPFs require a DPF user to manually select each image or manually insert media containing digital images to be viewed. There is no autonomous means to select images stored on a home PC for delivery to a digital display appliance.

Some known DPFs get their images from digital still camera media. The user must manually insert the media into the digital picture display appliance. To display images from a personal archive, the user must manually select and copy each image to the removable media, then convey the removable media to the DPF and insert it.

Other known DPFs provide a Web interface to upload images that will be relayed to a particular digital picture display via a modem transfer at a later time. To load images into these frames, the user logs onto his or her account at the host Web site, selects the appropriate function to send images to the digital picture display, and then selects the images by browsing to them in the file structure. The user proceeds to select the path and filename on his PC of each image he wishes to upload. He then waits for the images to upload and repeats the process until all the desired images are loaded. If the images have been previously uploaded to the Web site, the user selects the images to display by clicking on thumbnail views of available images.

By contrast, in embodiments of the current invention, images are sent to the DPF through an automated search and retrieval function. No manual involvement is needed, although manual image selection could augment or replace the automated process when desired.

Other image-oriented search engines are currently known. For example, within programs such as PowerPoint™, search and retrieval capability is provided for images and clip art. The user can also search by categories. These programs can search both local and remote archives of media. However, these search engines are initiated manually, and the rules for the search are volatile, not persistent. Searching based on date or other image-centric metadata is not possible.

In embodiments of the present invention, consumers can enjoy seeing new pictures from their photo archives each day, without manual involvement. An autonomous system mines the home PC image archives according to the user's persistent wishes. In one embodiment, using a calendar function as a default rule enables pictures to appear synchronized with the season and with family holidays and events. The process is particularly well suited to "dusting off" images from personal digital image collections and enabling them to be displayed effortlessly.

Other known search engines do not have persistent parameters, requiring the appliance user to be present and to manually enter them prior to execution. Other known digital picture display appliances also require manual image selection or insertion of media to display desired images.

Figure 18:
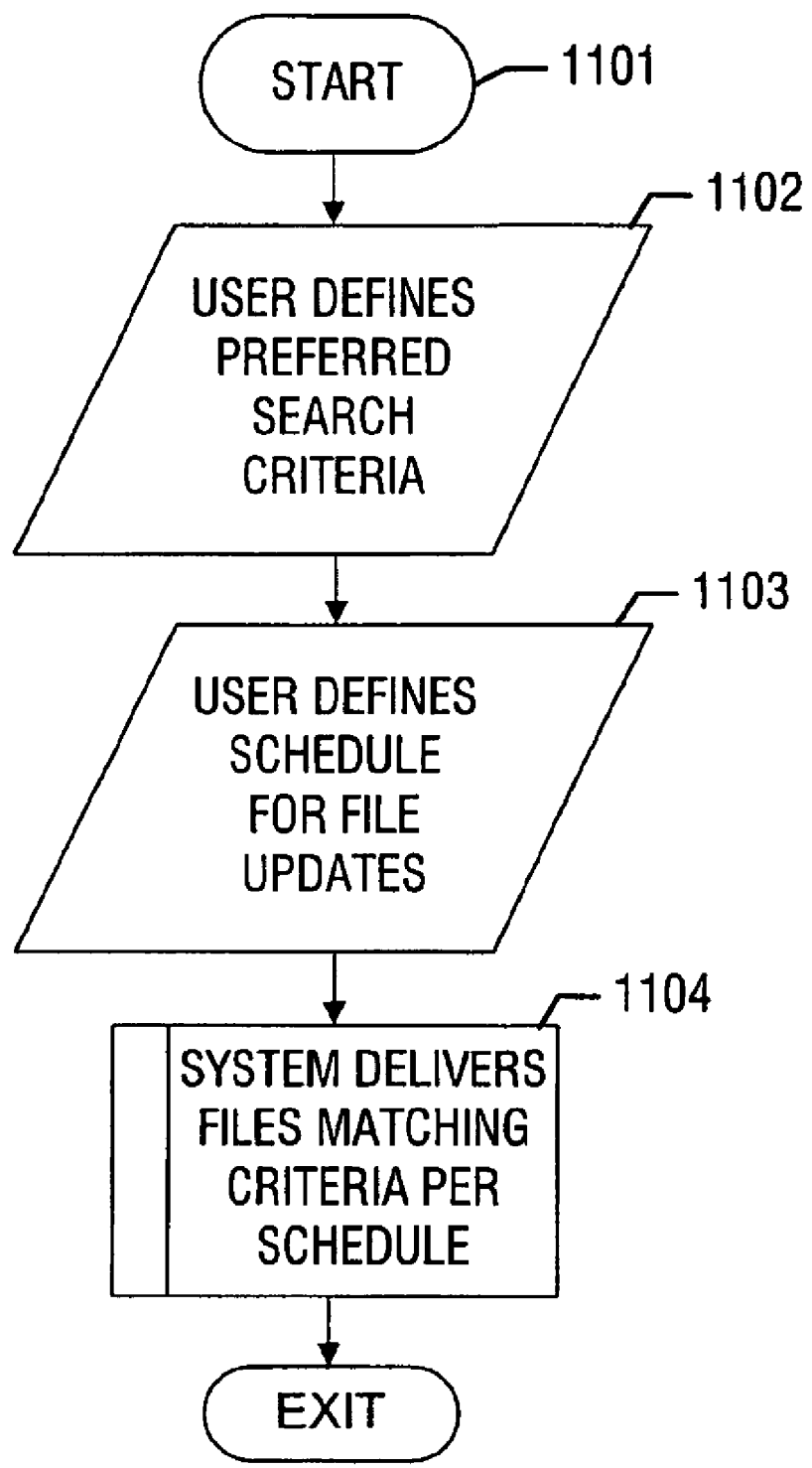
FIG. 18 is a high-level flow diagram illustrating an exemplary method for a host to find and deliver user-defined digital content to a processor-based appliance, in accordance with an embodiment of the present invention.

FIG. 18 is a high-level flow diagram illustrating an exemplary method 1101 for a host to find and deliver user-defined digital content to a processor-based appliance, in accordance with an embodiment of the present invention.

In 1102, the user defines or specifies preferred search criteria, such as the content folders or directories to be included in the search and the desired search parameters such as date or keyword. In one embodiment, the user desires to find files, e.g. digital media content files, that satisfy a particular search criteria. As one example, the user may wish to find all pictures of Yosemite National Park in the summertime and to periodically convey a subset of them to the user's processor-based appliance, eventually transmitting the entire retrieved search set in portions over a user-specified interval or according to a user-specified schedule. In one embodiment, this feature is referred to as "automatic content database mining".

In 1103, the user defines a desired schedule for file updates. For example, if the user chooses a time descriptor, the user could specify that pictures taken between 6 a.m. and 10 a.m. be selected to be displayed during the same hours today.

In 1102 and 1103, in a preferred embodiment, the user is operating from the host.

In 1104, the host system looks for, accesses, and delivers files to the appliance matching the user's search criteria and the user's desired schedule.

Figure 19:
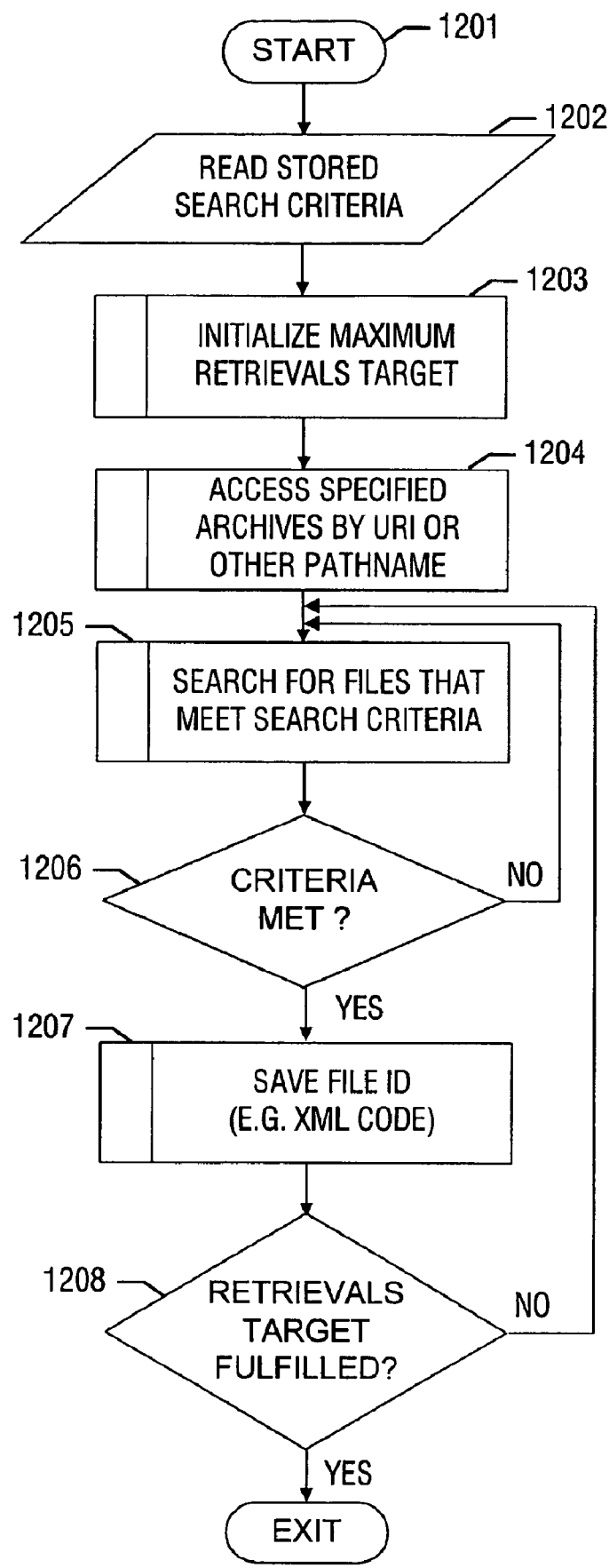
FIG. 19 is a more detailed flow diagram illustrating an exemplary method for a host to find and deliver user-defined digital content to a processor-based appliance, in accordance with an embodiment of the present invention.

FIG. 19 is a more detailed flow diagram illustrating an exemplary method 1201 for a host to find and deliver user-defined digital content to a processor-based appliance, in accordance with an embodiment of the present invention. The user's search criteria can be generated by a user operating either a host or a processor-based appliance coupled to a host.

In 1202, the host reads user-specified search criteria for a specific appliance. The search criteria can be input to the host via a small application, or it can be copied from stored criteria established for another appliance generated by the user several days or weeks earlier. From the appliance's registration data record, the host looks up the maximum number of images or total combined file size to return. This is referred to as a "maximum retrievals target".

At 1203, the maximum retrievals target is initialized.

At 1204, the file domains for the search are retrieved from the user preference specification. Next, the host searches for digital media content files that may be archived either locally on the host or that are archived in a network, e.g. the Web. The source of the files may be searched by any type of object retrieval string or pathway, such as a Universal Resource Identifier (URI) or Universal Resource Locator (URL).

At 1205, the host searches for one or more specific files that meet the user's search criteria.

At 1206, a determination is made whether the search criteria has been met for a specific digital media content file. If so, the method goes to 1207; otherwise, it loops back to the beginning of 1205.

At 1207, an identifier for the file(s) is saved. In one embodiment, nodes of Extensible Markup Language (XML) code may contain pointers to the location of matching digital files.

At 1208, a determination is made whether the maximum retrievals target has been met. If so, the method returns; otherwise, it loops back to the beginning of 1205.

Automated Digital Media Uploading from an Appliance to a Host Computer

The following description relates to features that enable a processor-based appliance, such as a DPF, to easily upload digital media files to a host computer archiving a plurality of digital media files. In contrast, known DPFs are incapable of wirelessly sending an image from a DPF to a host computer, such as a PC.

In embodiments of the invention, a host computer, such as a PC, is used as a convenient digital repository of digital media files. It is desirable that the computing devices do not create additional chores for their owners. For example, when a user returns home from an event with new digital pictures, it would be an undesirable burden to require him to power up the host in order to move the new pictures to the appliance for viewing.

An exemplary DPF system allows the user to load the new images from his or her digital camera into the appliance and enjoy them immediately. At the next opportunity when both host and appliance are active, the DPF can initiate the upload task for the new pictures to convey them into the host storage archive for the user. This system insures that images are archived without manual effort from the user. Thus it is desirable for a user of a DPF to be able to upload media files from a processor-based appliance, such as a DPF, to a host computer.

In one embodiment, an appliance user inserts a media cartridge into a wireless DPF and, while viewing or otherwise rendering the displayed contents of the cartridge, uploads it to a PC. The uploading process is automatic in at least one embodiment, working in the background without any human initiation or user involvement other than inserting a media storage element, such as a memory card or cartridge, into the appliance. Many other implementations are of course possible.

According to one embodiment, a host-appliance communications protocol enables media files to be transmitted from an appliance to a PC. A storage mechanism on the PC takes uploaded images, stores them in the PC's file system, and maintains a reference to the uploaded files.

The DPF can check to see whether any of the files contained on the inserted media cartridge are new. The process transmits a command to the host software, along with the file name and date stamp of the earliest image on the inserted media. If this file doesn't exist on the PC, all images will be transferred. If the file does exist on the PC, the PC searches the directory pertaining to the particular storage device (e.g. hard drive) and returns the date stamp of the last file received. Any files newer than this time will be uploaded by the DPF for archiving. This assists the PC in receiving only new files.

At this point, the appliance notifies the host software that an upload will begin. If the host does not reply (the host may be busy attending to other appliances or tasks), the upload is postponed until such time as the PC is available to conduct the upload from the appliance.

Upon verification of a ready-to-receive-upload state at the host side, the appliance can begin uploading content. Each file is uploaded with its filename and any associated metadata. As the file is committed to storage on the host, the host creates a reference for that file in its digital content storage tracking mechanism. In one embodiment, a uniquely identified folder or gallery can be created on the host as "Uploaded from Appliance", wherein all appliance uploads are stored for a particular appliance (each day can have its own sub-gallery). Many other ways of automatically organizing uploaded media files are also possible. At this point, the host user can manipulate the content as desired on the host.

In another embodiment, one or more audio files can be uploaded from an entertainment appliance, such as an MP3 device, to a user's PC, while simultaneously rendering an audio file on the MP3 device.

Figure 20:
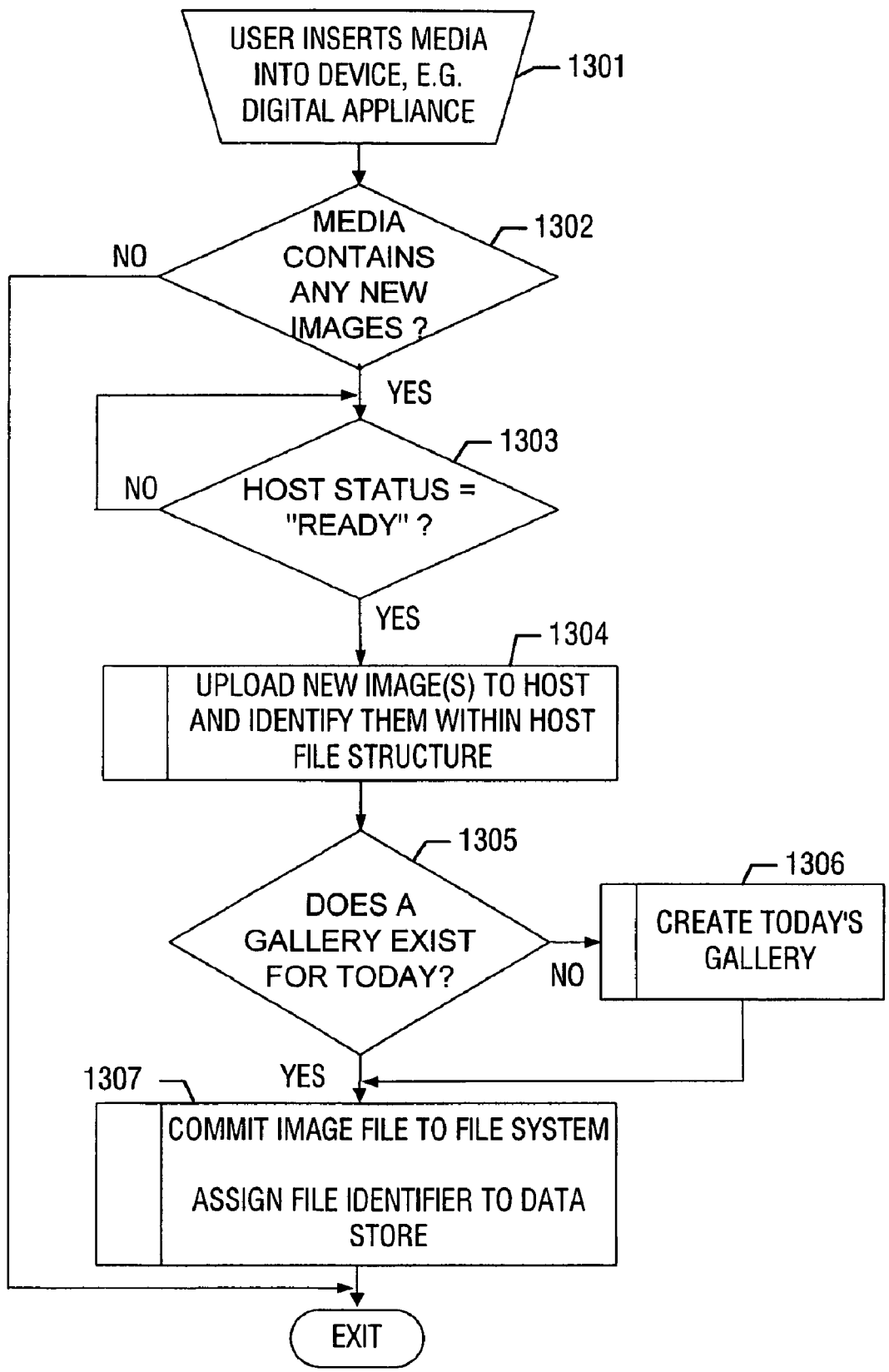
FIG. 20 is a flow diagram illustrating an exemplary method for a processor-based appliance to update a host with digital content, in accordance with an embodiment of the present invention.

FIG. 20 is a flow diagram illustrating an exemplary method 1301 for a processor-based appliance to update a host with digital content, in accordance with an embodiment of the present invention. In one embodiment, the method is performed after the user inserts digital storage media into a processor-based device, such as a digital appliance. The user could insert, for example, a memory card, MemoryStick™ device, SmartMedia™ device, or other storage device containing photo files taken by a digital camera into a suitable memory element slot (e.g. memory card slot 26, FIG. 1).

At 1302, a determination is made whether the digital storage media contains any new files or images. If so, the method goes to 1303; otherwise, it goes to 1308.

In 1303, a determination is made whether the host is in ready status. If so, the method proceeds to 1304; otherwise, it loops back to the beginning of 1303.

In 1304, any new image file(s) are uploaded to the host, where they are sufficiently identified within the host's file structure for subsequent retrieval.

At 1305, a determination is made whether a gallery exists for the current day. If so, the method goes to 1307; otherwise, it goes to 1306.

At 1306, a current gallery is created for today, and the method goes to 1307.

At 1307, each new uploaded image file is stored within the host's file system, appropriately assigning a file identifier to each image file within the data store.

The operations described above with respect to the methods illustrated in the figures can be performed in a different order from those described herein. Also, it will be understood that while a "done", an "end", or a "return" block is shown in certain figures, these methods may be performed continuously.

Embodiments of the present invention enable disparate processor-based devices to exchange digital media files easily, even automatically, without significant involvement on the part of a human user. By providing for a division of responsibility of tasks, a host having a relatively large resource capability can support the rendering of media files on an appliance having a relatively small resource capability.

In some embodiments, media files may be accessed and rendered on an appliance without active user involvement, while optionally permitting a user to control the access and display process to any desired extent.

In some embodiments, an appliance may automatically upload and archive media files to a host without active user involvement.

By using the software-implemented methods of embodiments of the present invention, many types of processor-based appliances such as, but not limited to, digital appliances and DPFs become more commercially attractive.

As shown herein, the present invention can be implemented in a number of different embodiments, including various methods, a host, a DPF, a network, and an article comprising a machine-accessible medium having associated instructions. Other embodiments will be readily apparent to those of ordinary skill in the art. The elements, algorithms, and sequence of operations can all be varied to suit particular requirements.

The illustrated architectures of the appliances and hosts described herein are only examples of possible architectures. Embodiments of the present invention are in no way limited to any particular architecture for the appliances or hosts.

FIGS. 1-7 and 17 are merely representational and are not drawn to scale. Certain proportions thereof may be exaggerated, while others may be minimized. FIGS. 1-20 illustrate various embodiments of the invention that can be understood and appropriately carried out by those of ordinary skill in the art.

Although specific embodiments have been illustrated and described herein, it will be appreciated by those of ordinary skill in the art that any arrangement or process that is calculated to achieve the same purpose may be substituted for the specific embodiments shown. This application covers any adaptations or variations of embodiments of the present invention. Therefore, it is manifestly intended that embodiments of this invention be limited only by the claims and the equivalents thereof.

It is emphasized that the Abstract is provided to comply with 37 C.F.R. §1.72(b) requiring an Abstract that will allow the reader to quickly ascertain the nature and gist of the technical disclosure. It is submitted with the understanding that it will not be used to interpret or limit the scope or meaning of the claims.

In the foregoing Detailed Description of Embodiments of the Invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description of Embodiments of the Invention, with each claim standing on its own as a separate preferred embodiment.

What is claimed is:

1. A method performed by a host comprising:

Storing a plurality of digital media files, the plurality of digital media files being organized in a three-level hierarchical file structure, wherein a first level includes a plurality of categories, wherein in a second level each category has a plurality of folders, wherein in a third level each folder has a plurality of sub-menu items, and wherein selected sub-menu items comprise thumbnail representations of digital media files;

wirelessly transmitting a polling inquiry within the vicinity of the host;

determining whether a response to the polling inquiry is received from a processor-based appliance within a predetermined time interval, wherein the response comprises a unique appliance identifier for the appliance; wherein the response further comprises user interface characteristics for the appliance, including a display resolution of the appliance, and a preferred language and font for a general user interface of the appliance; wherein the response further comprises a storage capacity of the appliance; wherein the response further comprises a list of data types and content file formats supported by the appliance; wherein the response further comprises audio and visual playback characteristics of the appliance;

upon determining that a response to the polling inquiry is received, registering the processor-based appliance;

retrieving text information from the host's file structure in the preferred language and font; and wirelessly transmitting the host's identical file structure to the appliance in the preferred language and font.

2. The method recited in claim 1 and further comprising:

wirelessly communicating the file structure of the plurality of digital media files to the appliance to render into one of a visual form and an audio form.

3. The method recited in claim 2 and further comprising:
wirelessly communicating a choice from the file structure being displayed at the appliance to the host.

4. The method recited in claim 3 wherein the choice is one of a sub-menu item and a digital media file.

5. The method recited in claim 1 wherein registering comprises:
allocating resources in the host for the processor-based appliance; and
initializing the processor-based appliance.

6. The method recited in claim 1 and further comprising:
wirelessly communicating a portion of the file structure to the processor-based appliance for display.

7. The method recited in claim 1 and further comprising:
wirelessly communicating at least one digital media file to the processor-based appliance for display.

8. The method recited in claim 7 wherein, in communicating, the processor-based appliance comprises a digital picture frame having a display, and the at least one digital media file comprises a digital photograph.

9. The method recited in claim 1 and further comprising:
wirelessly communicating a locale identifier to the processor-based appliance for display.

10. The method recited in claim 1, wherein the host comprises a personal computer.

11. The method recited in claim 1, wherein the processor-based appliance comprises a digital picture frame.

12. A method performed by a processor-based appliance comprising:
wirelessly transmitting a registration request within the vicinity of the appliance, wherein the registration request comprises a unique appliance identifier for the appliance; wherein the registration request further comprises user interface characteristics for the appliance, including a display resolution of the appliance, and a preferred language and font for a general user interface of the appliance; wherein the registration request further comprises a storage capacity of the appliance; wherein the registration request further comprises a list of data types and content file formats supported by the appliance; wherein the registration request further comprises audio and visual playback characteristics of the appliance;
determining whether a response to the registration request is wirelessly received from a host within a specified time interval;
upon determining that a response to the registration request is wirelessly received from the host with the specified time interval, the appliance receiving confirmation of registration from the host; and
receiving from the host a plurality of digital media files organized in a three-level hierarchical file structure, wherein a first level includes a plurality of categories, wherein in a second level each category has a plurality of folders, wherein in a third level each folder has a plurality of sub-menu items, and wherein selected sub-menu items comprise thumbnail representations of digital media files.

13. The method recited in claim 12 wherein the processor-based appliance comprises a digital picture frame having a display, and the at least one digital media file comprises a digital photograph.

14. The method recited in claim 12 wherein the method further comprises:
the processor-based appliance displaying at least one of digital media file and menu information from the host.

15. The method recited in claim 12 wherein, upon determining a response is not received, the method further comprises:
the processor-based appliance displaying at least one of a digital media file and menu information stored in the processor-based appliance.

16. The method recited in claim 12, wherein the host comprises a personal computer.

17. The method recited in claim 12, wherein the processor-based appliance comprises a digital picture frame.

18. A method performed by a host comprising:
storing a plurality of digital media files, the plurality of digital media files being organized in a three-level hierarchical file structure, wherein a first level includes a plurality of categories, wherein in a second level each category has a plurality of folders, wherein in a third level each folder has a plurality of sub-menu items, and wherein selected sub-menu items comprise thumbnail representations of digital media files;
wirelessly broadcasting a polling inquiry within the vicinity of the host;
receiving a registration response to the polling inquiry from a processor-based appliance within a predetermined time interval; wherein the response comprises a unique appliance identifier for the appliance; wherein the response further comprises user interface characteristics for the appliance, including a display resolution of the appliance, and a preferred language and font for a general user interface of the appliance; wherein the response further comprises a storage capacity of the appliance; wherein the response further comprises a list of data types and content file formats supported by the appliance; wherein the response further comprises audio and visual playback characteristics of the appliance;
registering the registration response from the appliance;
retrieving text information from the host's file structure in the preferred language and font; and
wirelessly transmitting the host's identical file structure to the appliance in the preferred language and font.

19. The method recited in claim 18, wherein the plurality of digital media files comprise photographs, audio files, and video files.

20. The method recited in claim 19 and further comprising:
wirelessly communicating at least one digital media file to the appliance for display.

21. The method recited in claim 18 and further comprising:
wirelessly communicating a locale identifier to the appliance for display, wherein the locale identifier identifies a physical location of the appliance.

22. The method recited in claim 18 wherein registering comprises:
allocating storage resources in the host for the appliance; and
initializing the appliance.

23. The method recited in claim 18 wherein transmitting comprises:
formatting the plurality of sub-menu items into multiple smaller groups for transmission to the appliance.

* * * * *